(12) United States Patent
Kuwahara

(10) Patent No.: US 8,064,098 B2
(45) Date of Patent: Nov. 22, 2011

(54) DEVICE OPTIMIZING BOUNDARY VALUE TABLE FOR HALFTONING REFERENCE TO CORRECT GRADATION CHARACTERISTIC BASED ON CONDITION OF LIQUID EJECTING HEAD

(75) Inventor: Soichi Kuwahara, Kanagawa (JP)

(73) Assignee: Sony Corporation, Tokyo (JP)

( * ) Notice: Subject to any disclaimer, the term of this patent is extended or adjusted under 35 U.S.C. 154(b) by 615 days.

(21) Appl. No.: 12/296,883

(22) PCT Filed: Apr. 5, 2007

(86) PCT No.: PCT/JP2007/057673
§ 371 (c)(1),
(2), (4) Date: Oct. 10, 2008

(87) PCT Pub. No.: WO2007/119686
PCT Pub. Date: Oct. 25, 2007

(65) Prior Publication Data
US 2009/0115806 A1  May 7, 2009

(30) Foreign Application Priority Data

Apr. 14, 2006 (JP) .................................. 2006-112103
Apr. 14, 2006 (JP) .................................. 2006-112104

(51) Int. Cl.
| H04N 1/405 | (2006.01) |
| H04N 1/407 | (2006.01) |
| B41J 2/205 | (2006.01) |
| H04N 1/52  | (2006.01) |
| H04N 1/60  | (2006.01) |
| B41J 2/21  | (2006.01) |

(52) U.S. Cl. ...... 358/1.8; 358/3.03; 358/3.06; 358/3.21; 358/3.23; 358/3.26; 358/502; 358/504; 358/521; 358/534

(58) Field of Classification Search ............... 358/1.8, 358/1.9, 3.03, 3.05, 3.06, 3.21, 3.23, 3.26, 358/502, 504, 521, 523, 534, 406, 296; 347/5, 347/14, 15, 19
See application file for complete search history.

(56) References Cited

U.S. PATENT DOCUMENTS

2005/0200898 A1     9/2005  Kuwahara
2008/0316509 A1 *  12/2008  Kuwahara ...................... 358/1.8

FOREIGN PATENT DOCUMENTS

| JP | 02174365 A  * | 7/1990 |
| JP | 2002-252775   | 9/2002 |
| JP | 2005039450 A * | 2/2005 |
| JP | 2005-252633   | 9/2005 |

* cited by examiner

Primary Examiner — Scott A Rogers
(74) Attorney, Agent, or Firm — Robert J. Depke; Rockey, Depke & Lyons, LLC

(57) ABSTRACT

In a method of substantially correcting gradation values in a gradation correcting unit, the number of reproducible gradations is substantially reduced. Selection information of a boundary value table for multi-value error diffusion is stored, by ejection condition, in an information storing unit of a liquid ejecting head that can represent one pixel with a large number of liquid droplets. When the liquid ejecting head is mounted, selection information matching an ejection condition is read out and a boundary value table corresponding to the selection information is set for reference by a half toning unit. Consequently, the boundary value table is optimized to correct a gradation characteristic without substantially reducing the number of reproducible gradations.

5 Claims, 35 Drawing Sheets

FIG.6

| INPUT SIGNAL | OUTPUT SIGNAL |
|:---:|:---:|
| 0 | 0 |
| 1 | 0 |
| 2 | 0 |
| 3 | 1 |
| 4 | 1 |
| 5 | 2 |
| 6 | 2 |
| 7 | 3 |
| 8 | 3 |
| 9 | 3 |
| 10 | 4 |
| . | . |
| . | . |
| . | . |
| 251 | 225 |
| 252 | 230 |
| 253 | 236 |
| 254 | 236 |
| 255 | 255 |

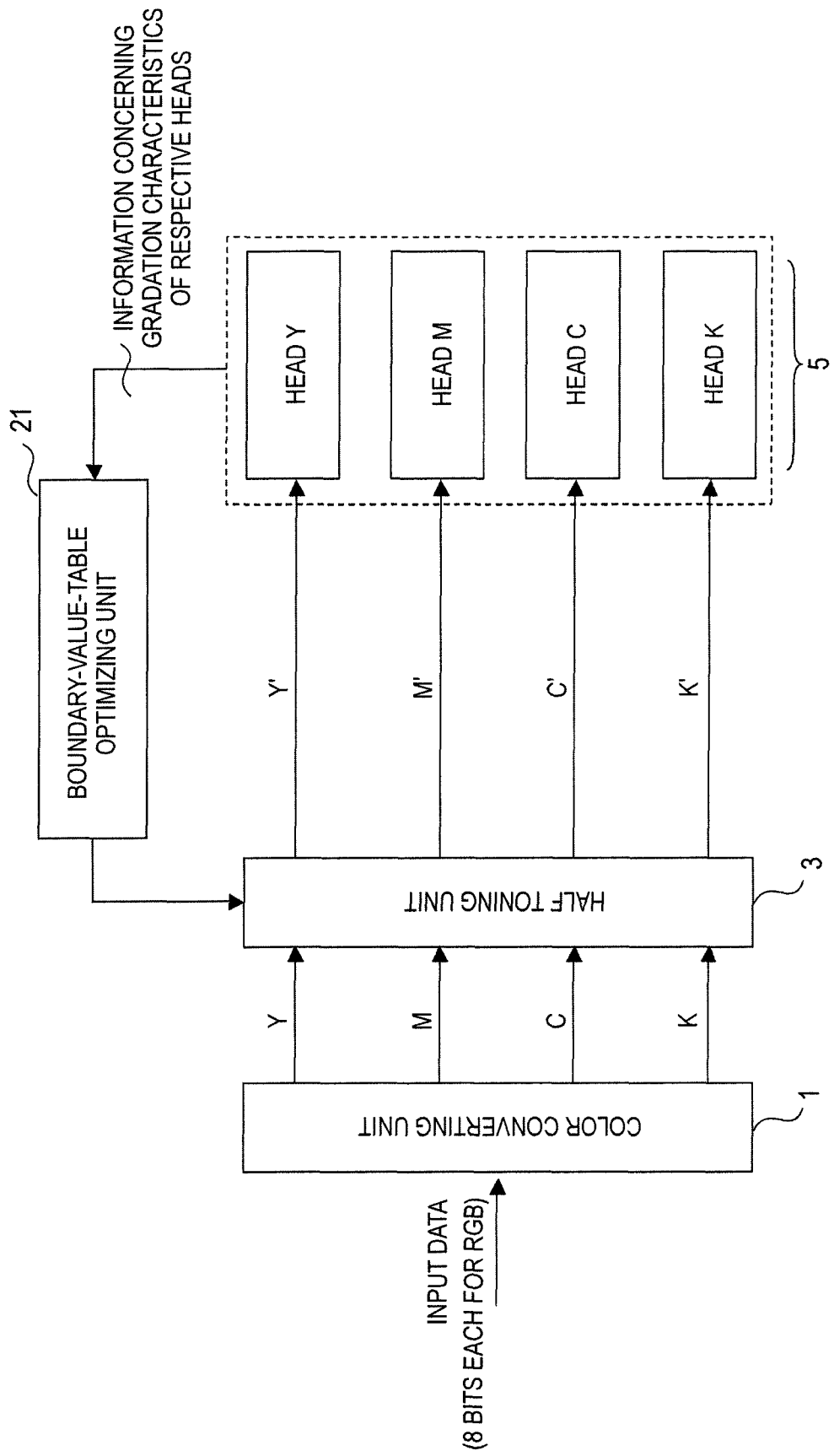

FIG.15

| SELECTED INFORMATION | BOUNDARY VALUE TABLE |
|---|---|
| 1 | BOUNDARY VALUE TABLE 1 |
| 2 | BOUNDARY VALUE TABLE 2 |
| 3 | BOUNDARY VALUE TABLE 3 |
| ⋮ | ⋮ |
| N-1 | BOUNDARY VALUE TABLE N-1 |
| N | BOUNDARY VALUE TABLE N |

FIG.22

| INPUT SIGNAL | THRESHOLD | BOUNDARY VALUE L | BOUNDARY VALUE H | OUTPUT VALUE L | OUTPUT VALUE H |
|---|---|---|---|---|---|
| 0 | 0 | 0 | 0 | 0 | 0 |
| 1 | 69 | 0 | 138 | 0 | 1 |
| 2 | 69 | 0 | 138 | 0 | 1 |
| 3 | 69 | 0 | 138 | 0 | 1 |
| 4 | 69 | 0 | 138 | 0 | 1 |
| 5 | 69 | 0 | 138 | 0 | 1 |
| 6 | 69 | 0 | 138 | 0 | 1 |
| . | . | . | . | . | . |
| . | . | . | . | . | . |
| . | . | . | . | . | . |
| . | . | . | . | . | . |
| . | . | . | . | . | . |
| 248 | 234 | 212 | 255 | 2 | 3 |
| 249 | 234 | 212 | 255 | 2 | 3 |
| 250 | 234 | 212 | 255 | 2 | 3 |
| 251 | 234 | 212 | 255 | 2 | 3 |
| 252 | 234 | 212 | 255 | 2 | 3 |
| 253 | 234 | 212 | 255 | 2 | 3 |
| 254 | 234 | 212 | 255 | 2 | 3 |
| 255 | 255 | 255 | 255 | 3 | 3 |

FIG.23

| INPUT SIGNAL | THRESHOLD | BOUNDARY VALUE L | BOUNDARY VALUE H | OUTPUT VALUE L | OUTPUT VALUE H |
|---|---|---|---|---|---|
| 0 | 0 | 0 | 0 | 0 | 0 |
| 1 | 38 | 0 | 76 | 0 | 1 |
| 2 | 38 | 0 | 76 | 0 | 1 |
| 3 | 38 | 0 | 76 | 0 | 1 |
| 4 | 38 | 0 | 76 | 0 | 1 |
| 5 | 38 | 0 | 76 | 0 | 1 |
| 6 | 38 | 0 | 76 | 0 | 1 |
| . | . | . | . | . | . |
| . | . | . | . | . | . |
| . | . | . | . | . | . |
| . | . | . | . | . | . |
| . | . | . | . | . | . |
| 248 | 240 | 224 | 255 | 4 | 5 |
| 249 | 240 | 224 | 255 | 4 | 5 |
| 250 | 240 | 224 | 255 | 4 | 5 |
| 251 | 240 | 224 | 255 | 4 | 5 |
| 252 | 240 | 224 | 255 | 4 | 5 |
| 253 | 240 | 224 | 255 | 4 | 5 |
| 254 | 240 | 224 | 255 | 4 | 5 |
| 255 | 255 | 255 | 255 | 5 | 5 |

FIG.24

| INPUT SIGNAL | THRESHOLD | BOUNDARY VALUE L | BOUNDARY VALUE H | OUTPUT VALUE L | OUTPUT VALUE H |
|---|---|---|---|---|---|
| 0 | 0 | 0 | 0 | 0 | 0 |
| 1 | 50 | 0 | 100 | 0 | 1 |
| 2 | 50 | 0 | 100 | 0 | 1 |
| 3 | 50 | 0 | 100 | 0 | 1 |
| 4 | 50 | 0 | 100 | 0 | 1 |
| 5 | 50 | 0 | 100 | 0 | 1 |
| 6 | 50 | 0 | 100 | 0 | 1 |
| . | . | . | . | . | . |
| . | . | . | . | . | . |
| . | . | . | . | . | . |
| . | . | . | . | . | . |
| . | . | . | . | . | . |
| 248 | 238 | 220 | 255 | 3 | 4 |
| 249 | 238 | 220 | 255 | 3 | 4 |
| 250 | 238 | 220 | 255 | 3 | 4 |
| 251 | 238 | 220 | 255 | 3 | 4 |
| 252 | 238 | 220 | 255 | 3 | 4 |
| 253 | 238 | 220 | 255 | 3 | 4 |
| 254 | 238 | 220 | 255 | 3 | 4 |
| 255 | 255 | 255 | 255 | 4 | 4 |

FIG.33

| PRINT DENSITY | BOUNDARY VALUE |
|---|---|
| 1 | BOUNDARY VALUE SET 1 |
| 2 | BOUNDARY VALUE SET 2 |
| 3 | BOUNDARY VALUE SET 3 |
| ⋮ | ⋮ |
| N-1 | BOUNDARY VALUE SET N-1 |
| N | BOUNDARY VALUE SET N |

DEVICE OPTIMIZING BOUNDARY VALUE TABLE FOR HALFTONING REFERENCE TO CORRECT GRADATION CHARACTERISTIC BASED ON CONDITION OF LIQUID EJECTING HEAD

The present application is a 371 U.S. National Stage filing of PCT application No. PCT/JP07/057673 filed Apr. 5, 2007, which claims priority to Japanese Patent Application No. JP2006-112103 filed Apr. 14, 2006, and Japanese Patent Application No. JP2006-112104 filed Apr. 14, 2006, all of which are hereby incorporated by reference. The present application claims priority to these previously filed applications.

TECHNICAL FIELD

The invention proposed in this specification relates to a technique for correcting fluctuation in a gradation characteristic peculiar to a liquid ejecting head.

The invention proposed by the inventor has aspects as a boundary value table optimizing device, a boundary value table setting device, a liquid ejecting head, a liquid ejecting device, and a computer program.

BACKGROUND ART

As one of significant factors influencing an image quality of a printing apparatus, there is a gradation characteristic. The gradation characteristic is explained below with reference to FIG. 1. FIG. 1 represents a schematic flow of data processing executed by the printing apparatus. In the case of FIG. 1, input data is given as digital data of an ROB format. A bit length of each of the colors is given as 8 bits and a bit length of the colors is given as 24 bits in total. In this case, the respective colors of RGB have information on 256 gradations from 0 to 255.

A color converting unit 1 converts the digital data in the RGB format into four colors corresponding to ink colors, i.e., respective digital data (each including 8 bits from 0 to 255) of Y (yellow), M (magenta), C (cyan), and K (black).

A half toning unit 3 converts the digital data after color correction into driving data for heads 5 corresponding to the respective colors.

The heads 5 eject ink droplets on the basis of the driving data and form print image on a print medium.

It is assumed that the density of an output result with respect to the digital data (0 to 255) after this color conversion is required to have a linear relation shown in FIG. 2. Ideally, a relation between the digital data and the density is not limited to the linear relation.

As a numerical value representing density, besides optical density, various numerical values such as a value of L* of a Lab color space, an absolute value of ⅓th power of X, an absolute value of ⅓th power of Y, and an absolute value of ⅓th power of Z of an XYZ color space, and a read value by a scanner can be used.

Incidentally, the optical density is logarithmic representation of a degree of light not transmitted and reflected with respect to a certain portion of a photograph film, photographic paper, or the like. A minimum value of the optical density is 0.00 (entirely transmitted and reflected). A larger numerical value of the optical density indicates that an image is darker.

However, actually, the digital data and the density have a gradation relation of gradation saturated in a high density region as shown in FIG. 3.

Therefore, as shown in FIG. 4, a gradation correcting unit 7 is provided at a post stage of the color converting unit 1 to execute a correction operation for canceling the gradation characteristic shown in FIG. 3. An example of a gradation correction curve is shown in FIG. 5. According to this gradation correction, the digital data after color conversion and the density of the output result are corrected to satisfy the gradation relation shown in FIG. 2.

However, when the gradation correction indicated by the gradation correcting unit 7 is executed, as shown in FIG. 6, an actual number of gradations substantially decreases.

As one of methods of controlling the decrease in the number of gradations, there is a method of increasing the number of processed bits. For example, there is a method of changing 8-bit digital data into 10-bit or 12-bit digital data and processing the digital data.

However, this method has problems in that a large number of memories are necessary and processing speed falls.

A cause of these problems is that, when multi-gradation data is binarized by the error diffusion method, the gradation characteristic shown in FIG. 3 inevitably tends to appear.

To cope with these problems, the inventor proposes a method of improving the appearance of this gradation characteristic by applying the multi-value error diffusion method. The multi-value error diffusion method means an error diffusion method of changing three-value original image data to multi-value image data of about eight values and diffusing a density error caused in that case to peripheral pixels. In the multi-value error diffusion method, it is a general practice to determine, as boundary values, values obtained by equally dividing the number of gradations of the original image data by the number of multiple values.

However, a visual change in printing an image at a lowest level from a state in which no image is printed (level 0) is larger than a visual change in printing an image at a level 2 from a level 1. Therefore, when the level 0 and the level 1, the level 1 and the level 2, the level 2 and the level 3, and the level 3 and the level 4 are set at equal intervals, respectively, as shown in FIG. 7, a tendency that image density substantially shifts from an ideal state with respect to an input signal appears.

Therefore, the inventor proposes a method of optimizing boundary values for multi-value error diffusion such that a print result conforms to an ideal gradation characteristic curve (JP-A-2005-252633).

When this method is applied, a relation of image density to an input signal can be brought closer to an ideal relation as shown in FIG. 8. A gradation characteristic among boundary values may slightly shift with respect to a characteristic curve shown in FIG. 8. Therefore, in an actual printing system, a gradation correcting unit may also be used for the purpose of finely adjusting the shift.

However, in general, gradation characteristics of the respective print heads have fluctuation. Examples of a cause of the fluctuation include fluctuation in a nozzle diameter for ejecting ink droplets, fluctuation in the height of a liquid chamber, and fluctuation in heater performance.

Due to this characteristic fluctuation, there is a problem in that, even if the gradation characteristics shown in FIGS. 2 and 8 can be obtained for a certain head, the same characteristics are not obtained in another head.

JP-A-3-252269 discloses a method of solving this problem. In short, JP-A-3-252269 discloses a method of storing plural kinds of gradation correction data in a gradation correcting unit 7 and, on the other hand, storing information for selecting these gradation correction data in respective print heads to thereby use gradation correction data suitable for mounted heads during gradation correction.

However, the method of substantially correcting a gradation value using the gradation correcting unit in this way has a significant problem in that a realizable number of gradations substantially decreases as described above.

DISCLOSURE OF THE INVENTION

Therefore, the inventor proposes a mechanism for optimizing a gradation characteristic without practically reducing realizable gradation width.

In other words, the inventor proposes a mechanism for optimizing, according to information stored in liquid ejecting heads or on the basis of densities of test patterns actually formed, a boundary value table to be selected or created.

The inventor proposes four kinds of methods described below as methods of optimizing a boundary value table.

(A) Mechanism 1

Boundary Value Table Selection

The inventor proposes, as one of mechanisms, a method of reading out information for selecting an optimum boundary value table among plural kinds of boundary value tables from information storing units of print heads.

In other words, the inventor proposes a method of mounting processing functions described below as a boundary value table optimizing device.

(a) A selection-information readout unit that reads out, when information for selecting a boundary value table for multi-value error diffusion is stored, by ejection condition, in an information storing unit of a liquid ejecting head, which can represent one pixel with a large number of droplets, information matching an ejection condition from the information storing unit (b) A boundary-value-table setting unit that sets, for reference by a half toning unit, a boundary value table corresponding to the read-out information

(B) Mechanism 2

Boundary Value Table Creation 1

The inventor proposes, as one of mechanisms, a method of creating an optimum boundary value table from a set of boundary values read out from an information storing unit of a liquid ejecting head.

In other words, the inventor proposes a method of mounting processing functions described below as a boundary value table optimizing device.

(a) A boundary-value readout unit that reads out, when sets of boundary values for multi-value error diffusion are stored, by ejection condition, in an information storing unit of a liquid ejecting head, which can represent one pixel with a large number of droplets, a set of boundary values matching an ejection condition from the information storing unit (b) A boundary-value-table creating unit that creates a boundary value table on the basis of the read-out set of boundary values (c) A boundary-value-table storing unit that stores the created boundary value table (d) A boundary-value-table setting unit that sets the boundary value table for reference by a half toning unit

(C) Mechanism 3

Boundary Value Table Creation 2

The inventor proposes, as one of mechanisms, a method of creating an optimum boundary value table on the basis of boundary value determination information read out from an information storing unit of a liquid ejecting head.

In other words, the inventor proposes a method of mounting processing functions described below as a boundary value table optimizing device.

(a) A boundary-value-determination-information readout unit that reads out, when information for determining a set of boundary values for multi-value error diffusion is stored, by ejection condition, in an information storing unit of a liquid ejecting head, which can represent one pixel with a large number of droplets, information matching an ejection condition from the information storing unit (b) A boundary-value determining unit that determines a set of boundary values for multi-value error diffusion on the basis of the read-out information (c) A boundary-value-table creating unit that creates a boundary value table on the basis of the determined set of boundary values (d) A boundary-value-table storing unit that stores the created boundary value table (e) A boundary-value-table setting unit that sets the boundary value table for reference by a half toning unit

(D) Mechanism 4

Boundary Value Table Creation 3

The inventor proposes, as one of mechanisms, a method of actually forming test patterns using a liquid ejecting head, optically reading densities of the test patterns, and creating an optimum boundary value table from the read densities.

The inventor proposes a method of mounting processing functions described below as a boundary value table optimizing device.

(a) A test-pattern-signal generating unit that generate, according to an ejection condition, a test pattern signal used for determination of boundary values for multi-value error diffusion and directly drives a liquid ejecting that can represent one pixel with a large number of droplets (b) A density reading unit that optically reads density of a test pattern actually formed (c) A boundary-value-table setting unit that sets, for reference by a half toning unit, a boundary value table selected or created on the basis of the read density By adopting the mechanisms proposed by the inventor, even when fluctuation in gradation characteristics is present among liquid ejecting heads (nozzle chips), it is possible to correct the gradation characteristics to an optimum state without reducing gradation width.

BRIEF DESCRIPTION OF THE DRAWINGS

FIG. 6 is a diagram showing an example of an input/output relation in the case in which a gradation characteristic is corrected according to gradation correction.

FIG. 12 is a diagram showing a conceptual configuration of a printing apparatus proposed by the inventor.

FIG. 15 is a diagram showing an example of a table in which selection information and boundary value tables are associated.

FIG. 22 is a diagram showing an example of a boundary value table (the number of boundary values=3).

FIG. 23 is a diagram showing an example of a boundary value table (the number of boundary values=5).

FIG. 24 is a diagram showing an example of a boundary value table (the number of boundary values=4).

FIG. 33 is a diagram for explaining a relation between print densities and boundary values.

BEST MODE FOR CARRYING OUT THE INVENTION

A technique for optimizing a gradation characteristic according to the present invention is explained below.

A well-known or publicly-known technique in the technical field is applied to units not specifically illustrated or described in this specification.

An embodiment explained below are merely one embodiment of the present invention. The present invention is not limited to this embodiment.

(A) Printing System

A printing system as an example of a liquid ejecting device is explained below. In this embodiment, it is assumed that the printing system is an ink droplet ejecting apparatus (a so-called ink-jet printer).

First, the basis structure as a premise of the printing system is explained. In the following explanation, the basis structure is divided into print heads and a signal processing system.

(A-1) Print Heads

This printing system uses, as print heads, print heads of a system for ejecting ink droplets to a print medium. Various systems such as a method of using piezoelectric elements and a method of heating inks with a heater can be applied to an ink droplet ejecting mechanism.

Figure 9:
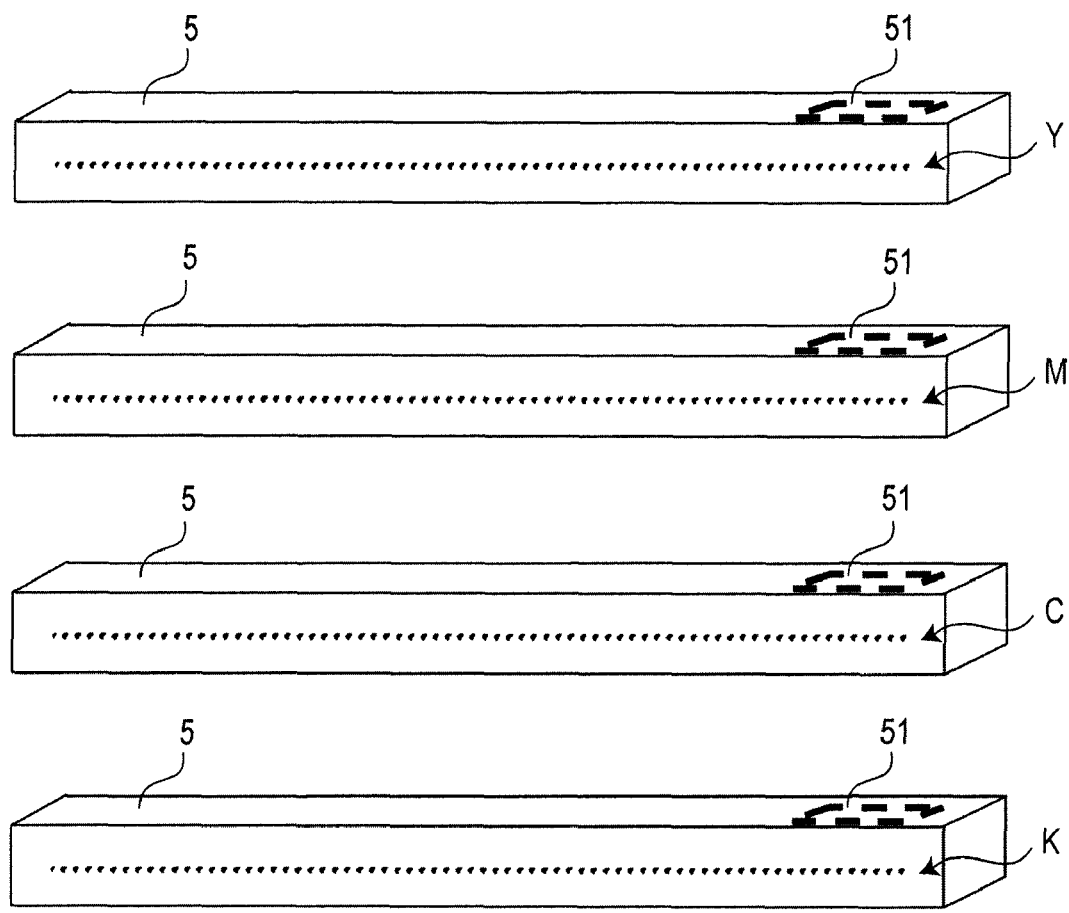
FIG. 9 is a diagram for explaining an example of the structure of print heads.

A conceptual diagram of nozzle surfaces forming print heads 5 is shown in FIG. 9. Black circles in the figure correspond to respective nozzles. The nozzles are arranged at a pitch corresponding to print resolution.

In the case of this embodiment, areas (information storing units) 51 that store information necessary for optimizing a boundary value table are mounted.

As the information storing units 51, besides structures that can electrically read out information such as a semiconductor memory, a resistor element, an arrangement pattern of contact points, and a logic circuit, a structure that can optically read out information such as a print pattern on a housing surface, a structure that can read out information according to mechanical coupling such as a cutout, and the like can be adopted.

The print heads shown in FIG. 9 represent that ink colors are four colors (Y, M, C, and K). In the case of print heads that can eject a larger number of ink colors, nozzle rows equal to or larger than four rows are arranged.

In the case of this embodiment, it is assumed that the print heads can form one pixel with plural ink droplets using one or plural nozzles. In other words, the print heads can represent one pixel in multiple gradations. Nozzle rows for four colors can also be formed on one print head.

Figure 10A:
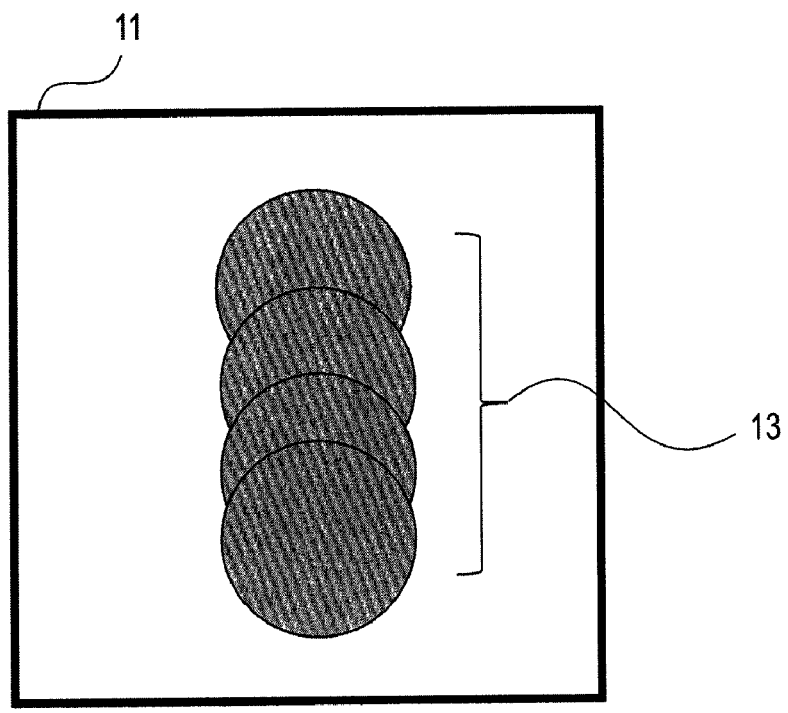
FIG. 10 is a diagram for explaining an example of formation of one pixel.
Figure 10B:
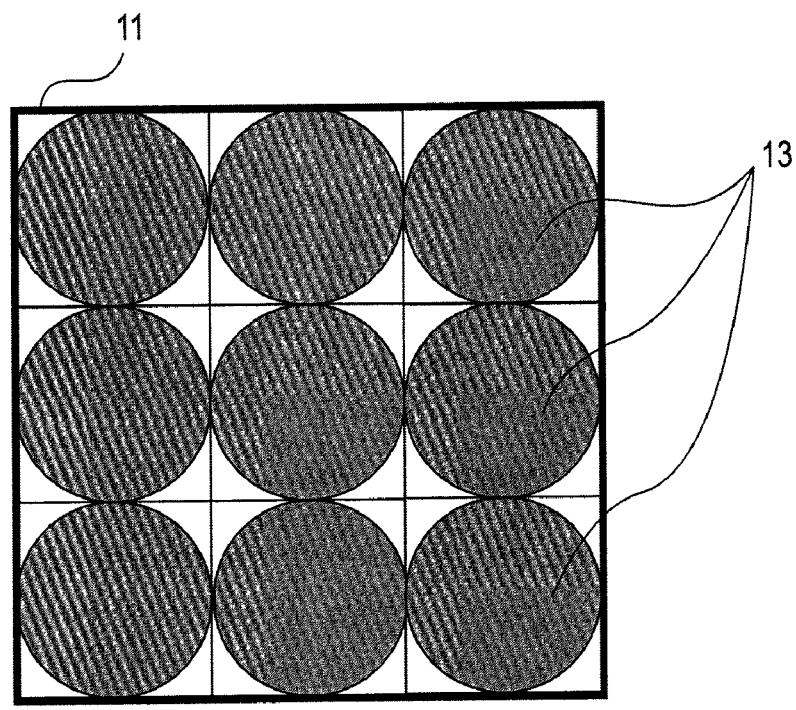

Examples of formation of one pixel are shown in FIG. 10. Actually, there is the influence of shift of ejection positions, blur, and the like.

(A) in FIG. 10 is an example in which one pixel is formed by ejecting ink droplets 13 to overlap each other while shifting arriving positions thereof in one pixel area 11. In the case of this example, one pixel is formed by four ink droplets 13.

(B) in FIG. 10 is an example in which one pixel area 11 is divided into plural sub-areas and one pixel is formed by ejecting an ink droplet by sub-area. In the case of this example, one pixel area 11 is formed by nine sub-areas.

In both the cases, one pixel area 11 can be represented by gradations at multiple stages.

A print system of the print heads may be a line head type or may be a serial head type.

Figure 11A:
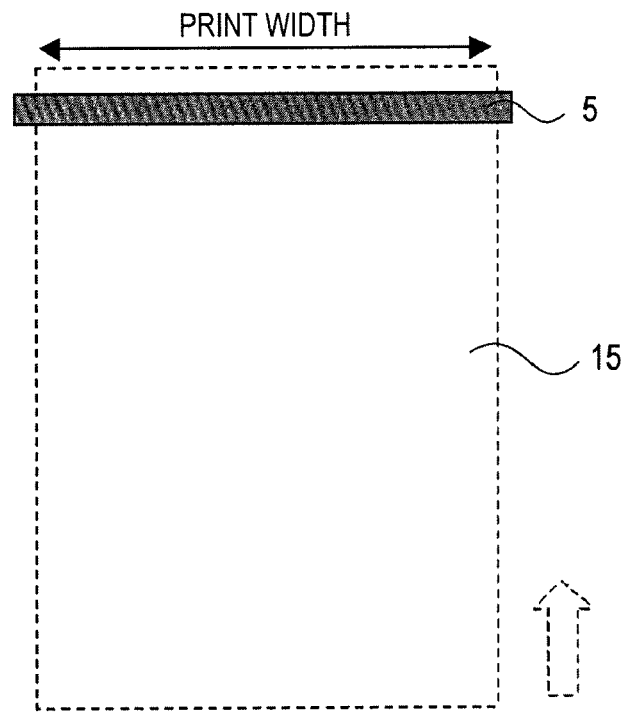
FIG. 11 is a diagram for explaining an example of driving of a print head.
Figure 11B:
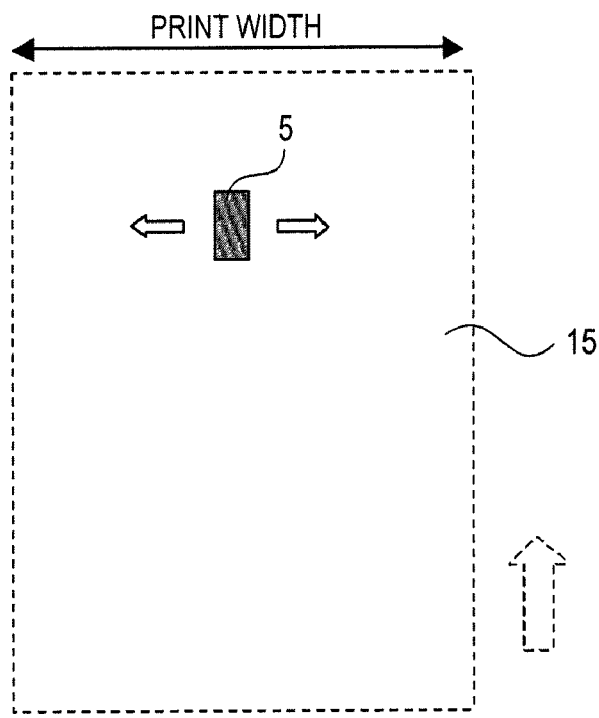

A print image of the line head type is shown in (A) in FIG. 11. The print heads 5 (nozzle rows) of this type are formed in length same as print width of the print medium 15 or larger than the print width. In this case, it is possible to form a print image without scanning the print heads 5 in a print width direction.

A print image of the serial head type is shown in (B) in FIG. 11. The print heads 5 (nozzle rows) is formed in length smaller than the print width of the print medium 15. In this case, a print image is formed by scanning the print head 5 in the print width direction of the print medium 15.

(A-2) Signal Processing System

Subsequently, a schematic configuration common to signal processing systems is explained.

Figure 1:
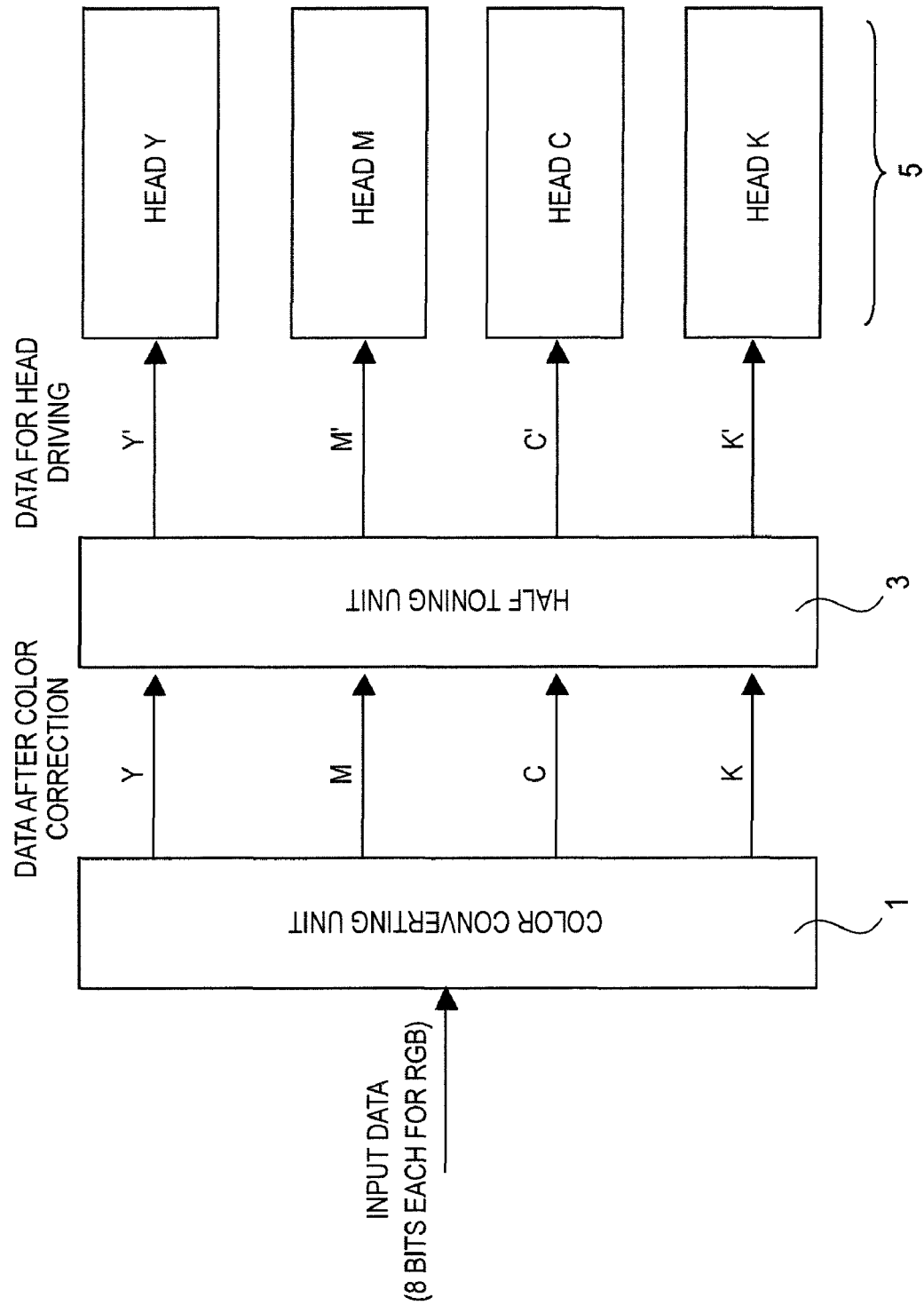
FIG. 1 is a diagram showing a schematic flow of data processing executed in a printing apparatus.
Figure 2:
FIG. 2 is a graph for explaining an ideal gradation characteristic.
Figure 3:
FIG. 3 is a graph for explaining a gradation characteristic of gradation saturated in a high-density region.

A signal processing system of a printing apparatus is schematically shown in FIG. 12. In FIG. 12, units corresponding to those shown in FIG. 1 are denoted by the identical reference numerals.

As shown in FIG. 12, the printing apparatus described below includes a color converting unit 1, a half toning unit 3, print heads 5, and a boundary-value-table optimizing unit 21 as main components. A gradation converting unit is basically unnecessary except that the gradation converting unit is supplementarily used for improving accuracy of correction of a gradation characteristic.

A specific method of realizing the boundary-value-table optimizing unit 21 is described later. Whatever the method is, the boundary-value-table optimizing unit 21 realizes a function of optimizing a boundary value table used in multi-value error diffusion processing of the half toning unit 3.

Examples of the optimization method include a method of selecting an appropriate boundary value table by print head (ink color or nozzle chip) out of plural boundary value tables and a method of creating an optimum boundary value table by print head (ink color or nozzle chip). As the method of creating a boundary value table, a method of creating a boundary value table on the basis of information read out from the information storing units 51 of the print heads 5 and a method of creating a boundary value table on the basis of measured density of a print result are conceivable.

In FIG. 12, it is assumed that information concerning gradation characteristics of the respective print heads is given to the boundary-value-table optimizing unit 21 in order to represent a function common to these methods.

The optimization of a boundary value table includes both a function of optimizing a shape of a gradation characteristic curve and a function of optimizing the number of ink droplets defining a gradation characteristic curve. In particular, when there is a difference in maximum density among the heads, stabilization of an image quality can be realized by optimizing the number of ink droplets. The difference in maximum density cannot be corrected by the gradation conversion disclosed in JP-A-3-252269.

(A-3) System Example

A system example of the printing apparatus is explained below by method of realizing the boundary-value-table optimizing unit 21.

(a) System Example 1

First, in explanation of this system example, boundary value tables optimum for the respective print heads are selected on the basis of selection information read from the print heads.

(a-1) System Configuration

Figure 4:
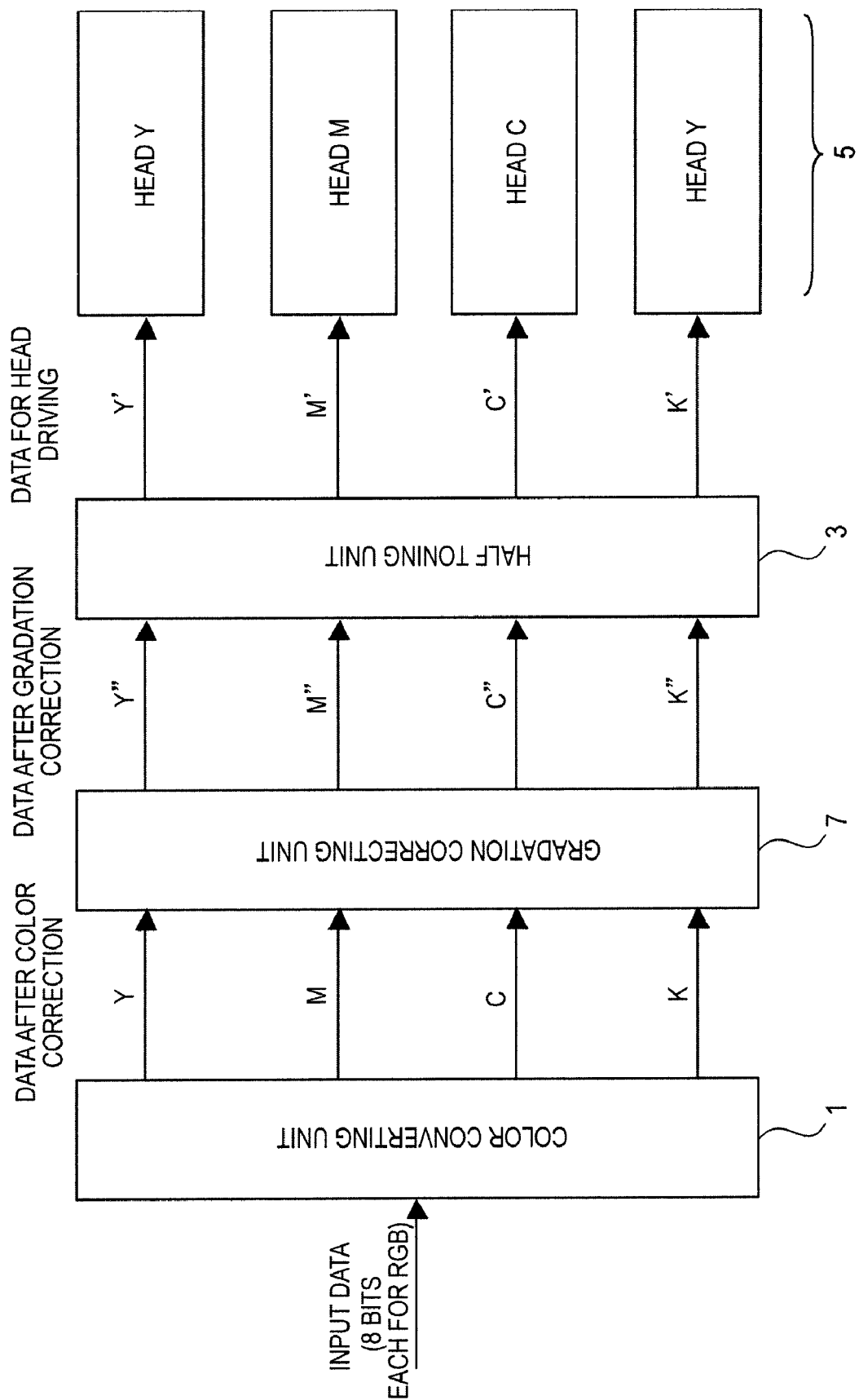
FIG. 4 is a diagram showing an example of a system configuration for correcting a gradation characteristic to an ideal state according to gradation correction.
Figure 5:
FIG. 5 is a graph showing an example of a gradation correction curve.
Figure 7:
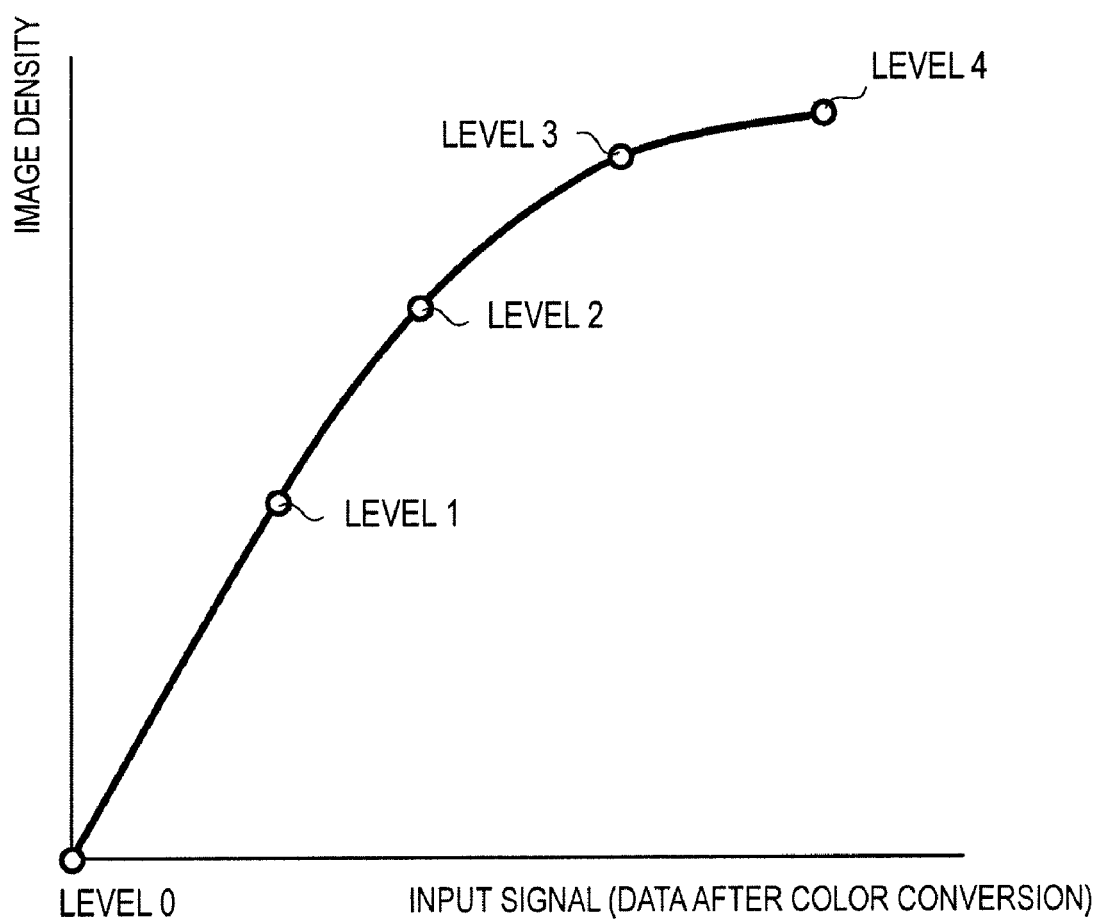
FIG. 7 is a graph showing a gradation characteristic of multi-value error diffusion processing in the case in which boundary values are set at equal intervals.
Figure 8:
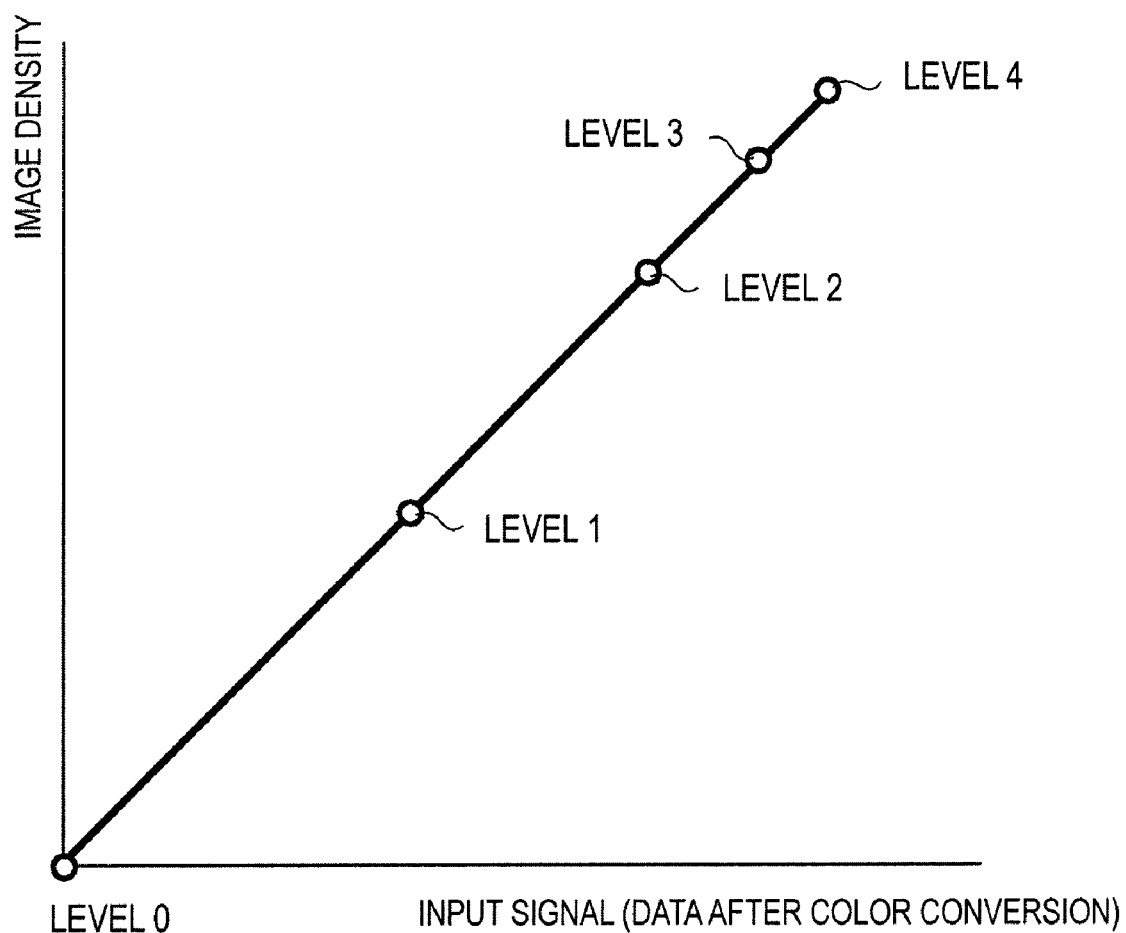
FIG. 8 is a graph showing a gradation characteristic of the multi-value error diffusion processing in the case in which the boundary values are optimized.
Figure 13:
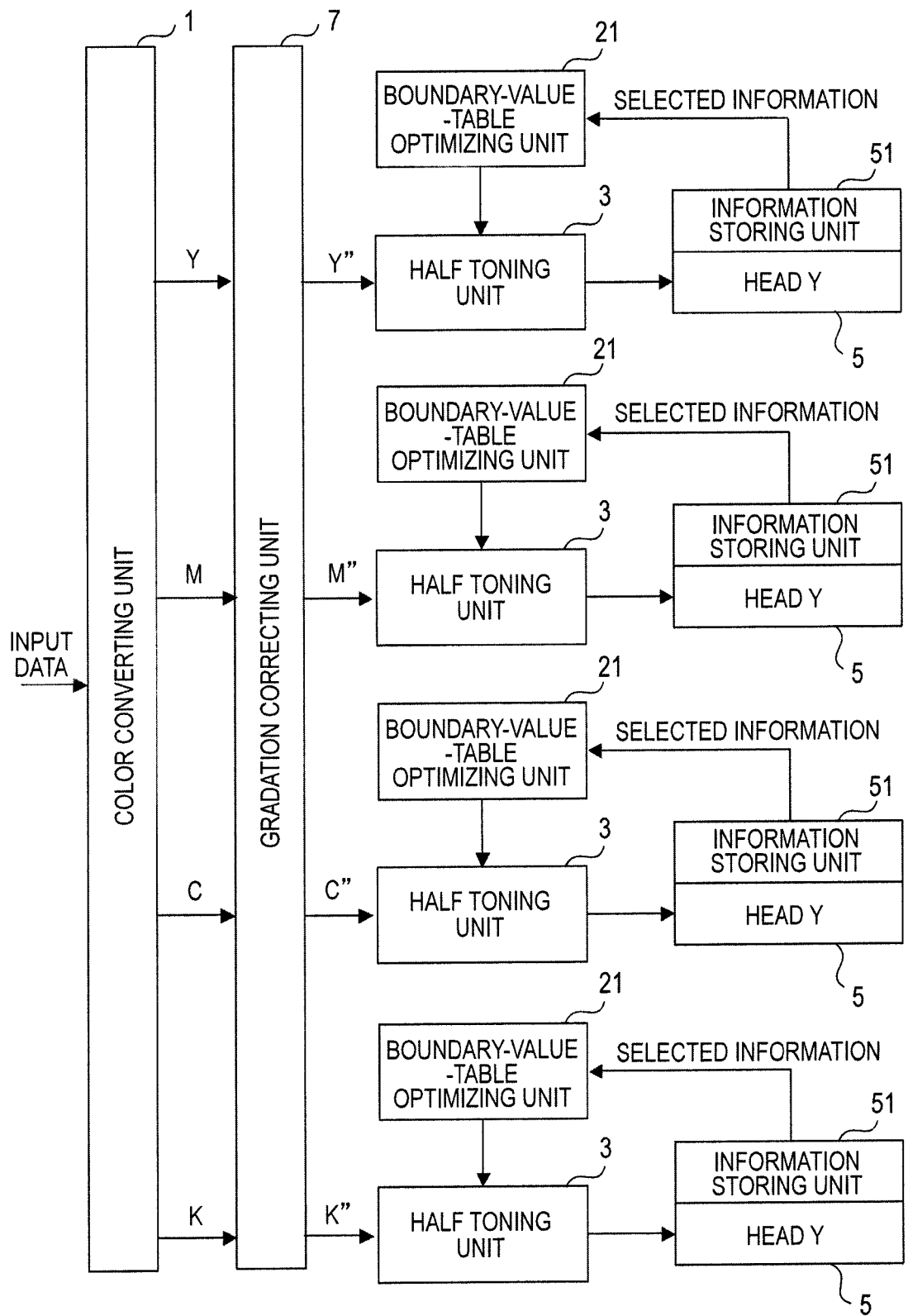
FIG. 13 is a diagram showing an example of a configuration of a printing apparatus corresponding to a system example 1.

A system example of a printing apparatus is shown in FIG. 13. In FIG. 13, units corresponding to those shown in FIGS. 4 and 12 are denoted by the identical reference numerals.

The printing apparatus shown in FIG. 13 includes the color converting unit 1, a gradation correcting unit 7, the half toning units 3, the print heads 5 (the information storing units 51), and the boundary-value-table optimizing units 21.

In the case of FIG. 13, the gradation correcting unit 7 is mounted. However, this gradation correcting unit 7 is used for adjusting a fine gradation that cannot be fully corrected by the half toning units 3.

Figure 14:
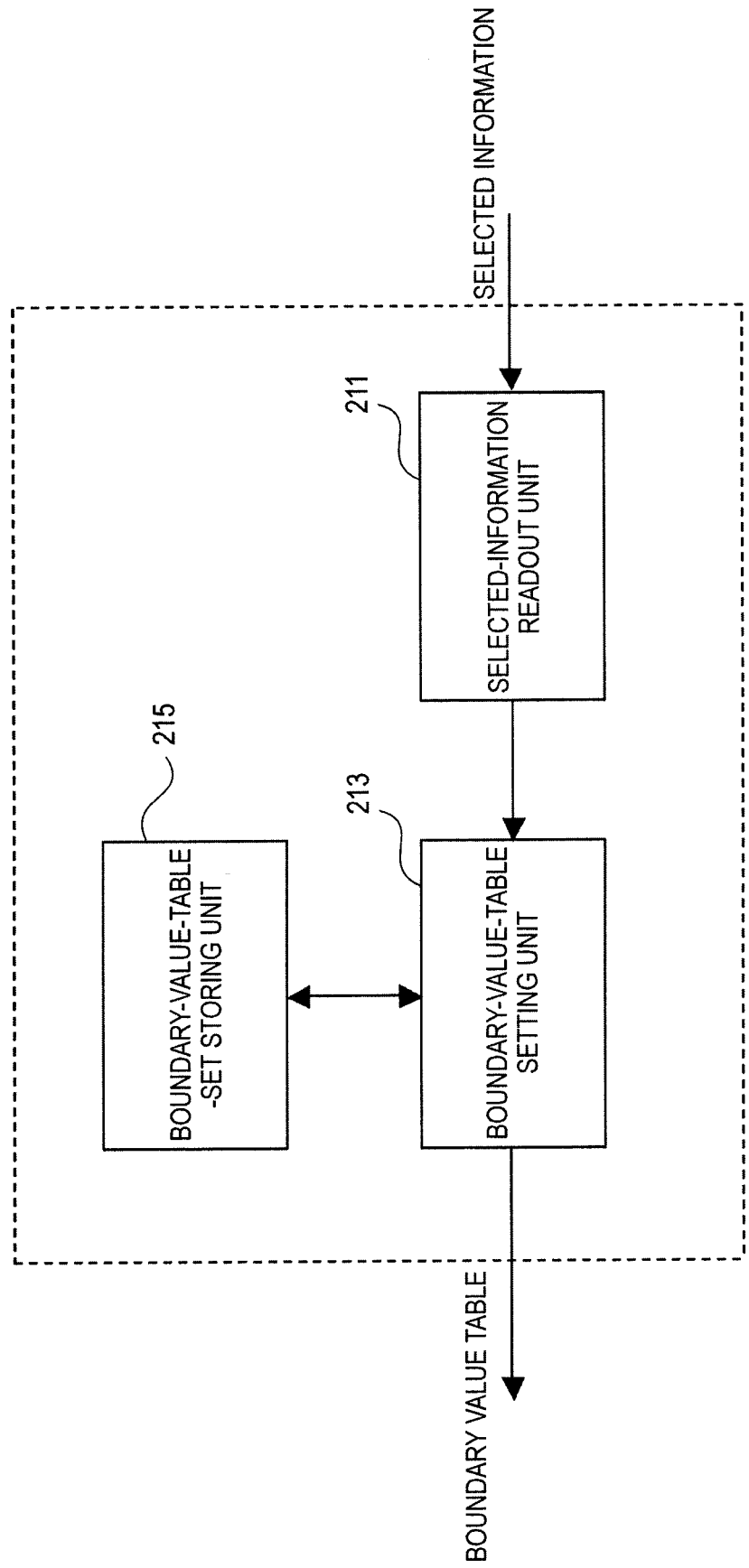
FIG. 14 is a diagram showing an example of a configuration of a boundary-value-table optimizing unit.

An example of a detailed configuration of the boundary-value-table optimizing unit 21 suitably applied to this system example is shown in FIG. 14.

The boundary-value-table optimizing unit 21 used in this system example includes a selection-information readout unit 211, a boundary-value-table setting unit 213, and a boundary-value-table-set storing unit 215.

The selection-information readout unit 211 is a processing device that reads out selection information of boundary value tables optimum for gradation characteristics peculiar to the respective print heads from the information storing unit 51 of the print head 5.

It is assumed that the selection information is stored by head as, for example, ROM data and resistances of variable resistors when the printing apparatus is shipped from a factory. The selection information is set for, for example, a Y ink, an M ink, a C ink, and a K ink. When nozzle rows corresponding to respective ink colors are formed by bonding plural nozzle chips as in print heads of the line head type, selection information can also be mounted by each nozzle chip.

Incidentally, a readout mechanism corresponding to a storage form of the selection information is adopted in the selection-information readout unit 211. For example, when the selection information is stored as ROM data, the selection-information readout unit 211 includes a ROM reader.

As content of the selection information, identification numbers, which are prepared on the printing apparatus side, given to the respective boundary value tables are used. Besides, information peculiar to gradation characteristics of the respective print heads such as an average of nozzle diameters and the number of boundary values is used.

The boundary-value-table setting unit 213 is a processing device that reads out a boundary value table corresponding to read-out selection information from the boundary-value-table-set storing unit 215 and sets the boundary value table for reference by the half toning unit 3. It goes without saying that the boundary value table is set by ink color (by attribute of an ink). It goes without saying that, when a nozzle row is formed by bonding plural nozzle chips, the boundary value table can also be set by each nozzle chip.

An example of a configuration of the boundary-value-table-set storing unit 215 is shown in FIG. 15. In the case of FIG. 15, N kinds (N is a natural number) of selection information and N boundary value tables are stored in association with each other.

The respective boundary value tables basically adopt the table structure in which a judgment threshold, a boundary value L, a boundary value H, an output value L, and an output value H are associated with an input signal value (a gradation value).

The judgment threshold is used as a judgment criterion with respect to a value (an input value) obtained by adding an error component of peripheral pixels to the input signal value.

The boundary value L is a boundary value allocated when the input value is smaller than the judgment threshold. The boundary value H is a boundary value allocated when the input value is larger than the judgment threshold.

The output value L and the output value H are the numbers of ink droplets (quantized values) allocated to the input value smaller than the judgment threshold and the input value larger than the judgment threshold, respectively.

The boundary-value-table setting unit 213 is a processing device that selects a boundary value table most suitable for the gradation characteristics of the print heads among the plural boundary value tables prepared in advance in this way and sets the boundary value table for reference by the half toning unit 3. According to the optimization of the boundary value table, even if fluctuation in gradation characteristics is present in the print heads, image density realized on a print medium through multi-value error diffusion processing of the half toning unit 3 can be brought closer to an ideal gradation characteristic.

(a-2) Optimizing Operation

First, an optimizing operation performed when maximum densities of the print heads corresponding to the respective ink colors are substantially the same is explained.

Figure 16:
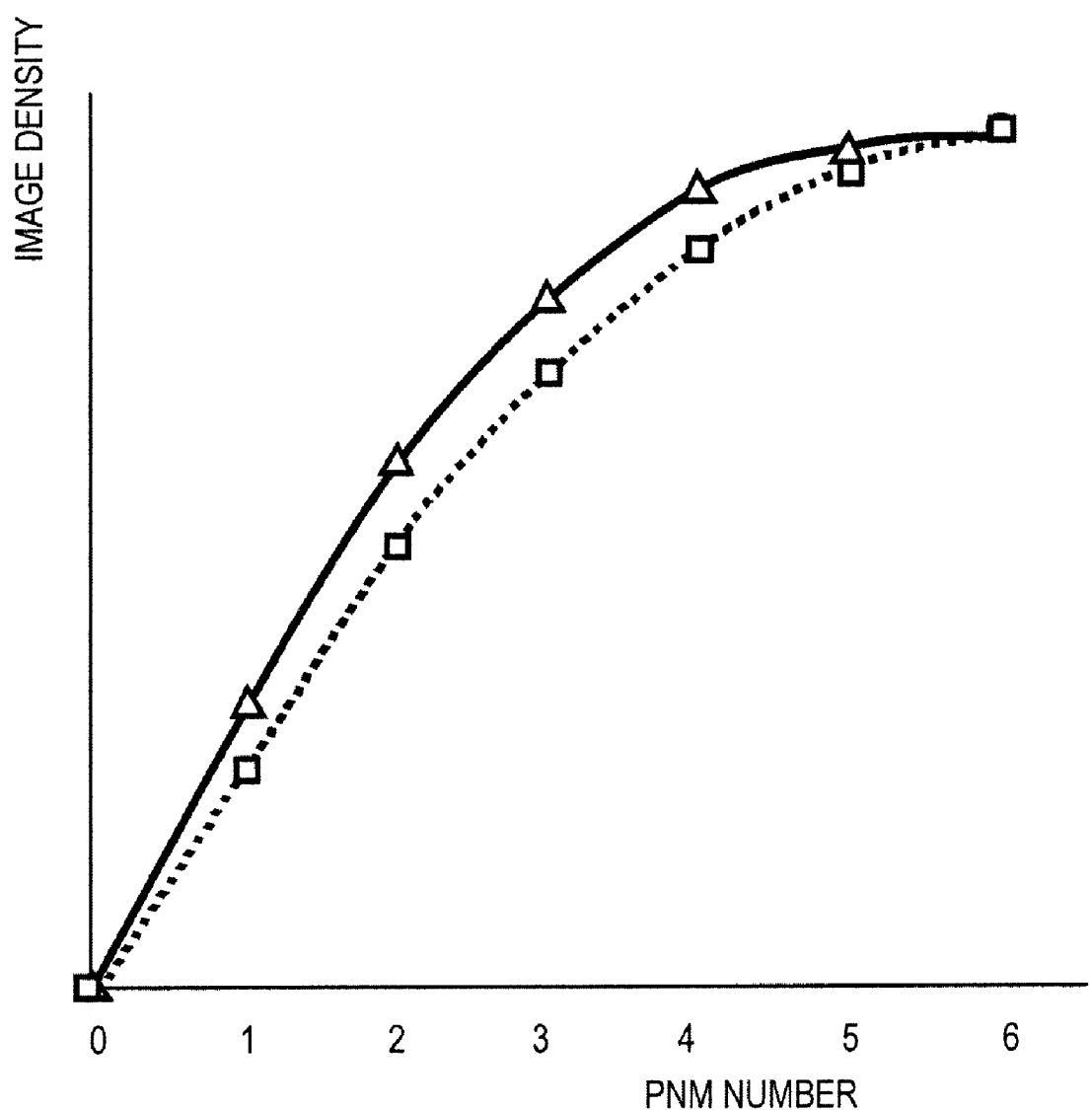
FIG. 16 is a graph for explaining a gradation characteristic before boundary values are optimized.

Two print heads having different shapes of gradation characteristics are shown in FIG. 16. As shown in FIG. 16, maximum densities are substantially the same. However, density reproduction characteristics in an intermediate gradation region are different. It is assumed that image densities in a high gradation region tend to saturate.

Figure 17:
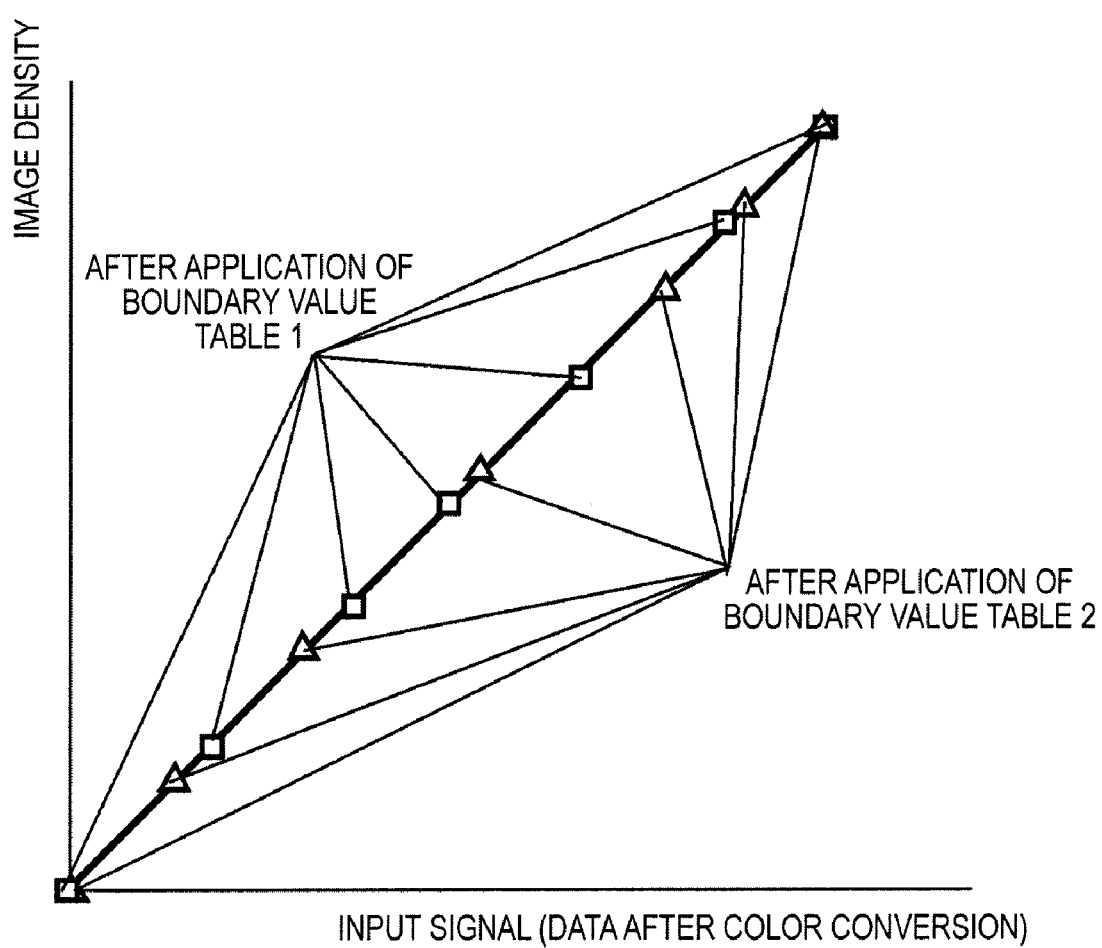
FIG. 17 is a graph for explaining a gradation characteristic after the boundary values are optimized.

When a boundary value table is optimized according to the gradation characteristics of the print heads, as shown in FIG. 17, the gradation characteristics of the two print heads are corrected to a substantially ideal gradation characteristic without a decrease in the number of gradations. Square signs on FIG. 17 indicate seven boundary values forming a boundary value table 1 and triangle signs indicate seven boundary values forming a boundary value table 2. In FIG. 17, the boundary values are excessively shifted to clarify a difference in a boundary value between the boundary value tables. However, shift of the boundary values is likely to occur only in one place. In any case, when the boundary values are optimized, gradation information of an input signal can be reproduced substantially directly.

The maximum densities of the print heads corresponding to the respective ink colors are not always identical to one another.

In this case, correct image density cannot be reproduced even if only a curve shape of a peculiar gradation characteristic is corrected.

Figure 18:
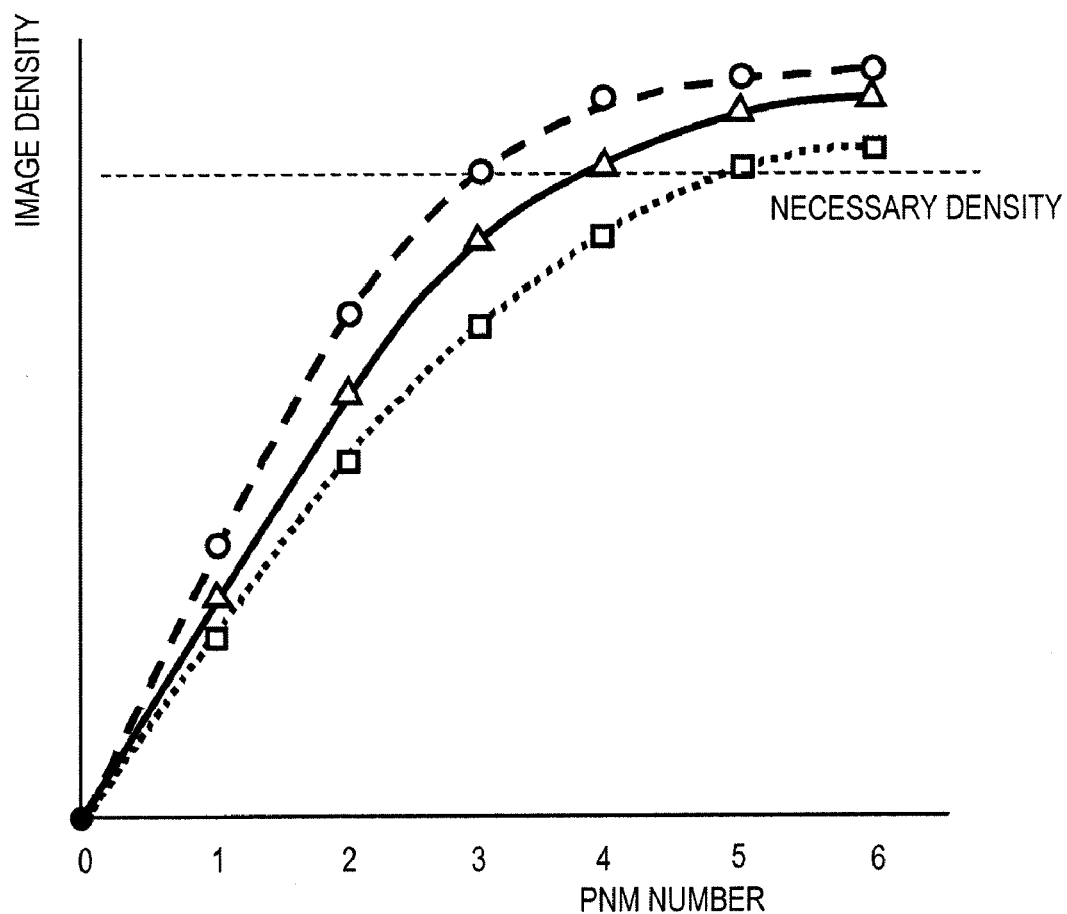
FIG. 18 is a graph for explaining a gradation characteristic in the case in which maximum density fluctuates.

An example in which maximum densities are different is shown in FIG. 18. FIG. 18 shows, concerning three kinds of print heads, a relation between the number of ink droplets forming one pixel and image density. As shown in FIG. 18, when maximum densities are different, an image quality falls near the maximum densities even if only boundary values used in the multi-value error diffusion processing are optimized.

Therefore, when a maximum value of the number of ink droplets that can be ejected for forming one pixel is sufficiently secured, a method of determining the number of boundary values to match maximum densities of the respective print heads is adopted.

For example, in the case of FIG. 18, it is seen that, to set the maximum densities of the respective print heads the same, the number of boundary values of a print head A only has to be set to "3", the number of boundary values of a print head B only has to be set to "5", and the number of boundary values of a print head C only has to be set to "4".

In this case, the number of boundary values "3" is set as selection information of a boundary value table in the information storing unit 51 of the print head A.

The number of boundary values "5" is set as selection information of a boundary value table in the information storing unit 51 of the print head B.

The number of boundary values "4" is set as selection information of a boundary value table in the information storing unit 51 of the print head B.

Figure 19:
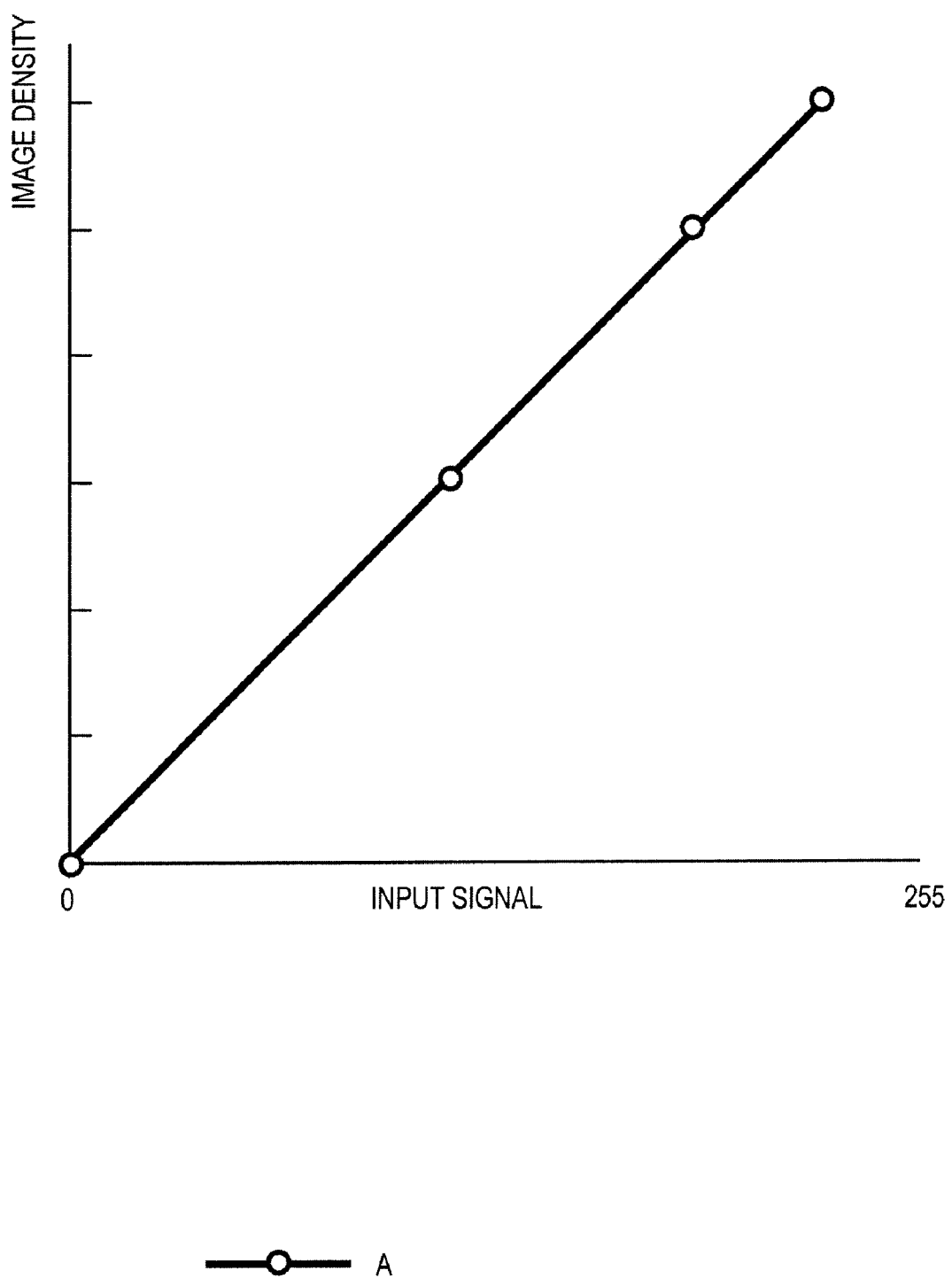
FIG. 19 is a graph for explaining an example of a gradation characteristic in the case in which the number of boundary values is optimized (the number of boundary values=3).

In this case, for example, if a boundary value table including boundary values "0", "138", "212", and "255" is applied to the print head A with the number of boundary values "4", an ideal gradation characteristic shown in FIG. 19 can be realized.

Figure 20:
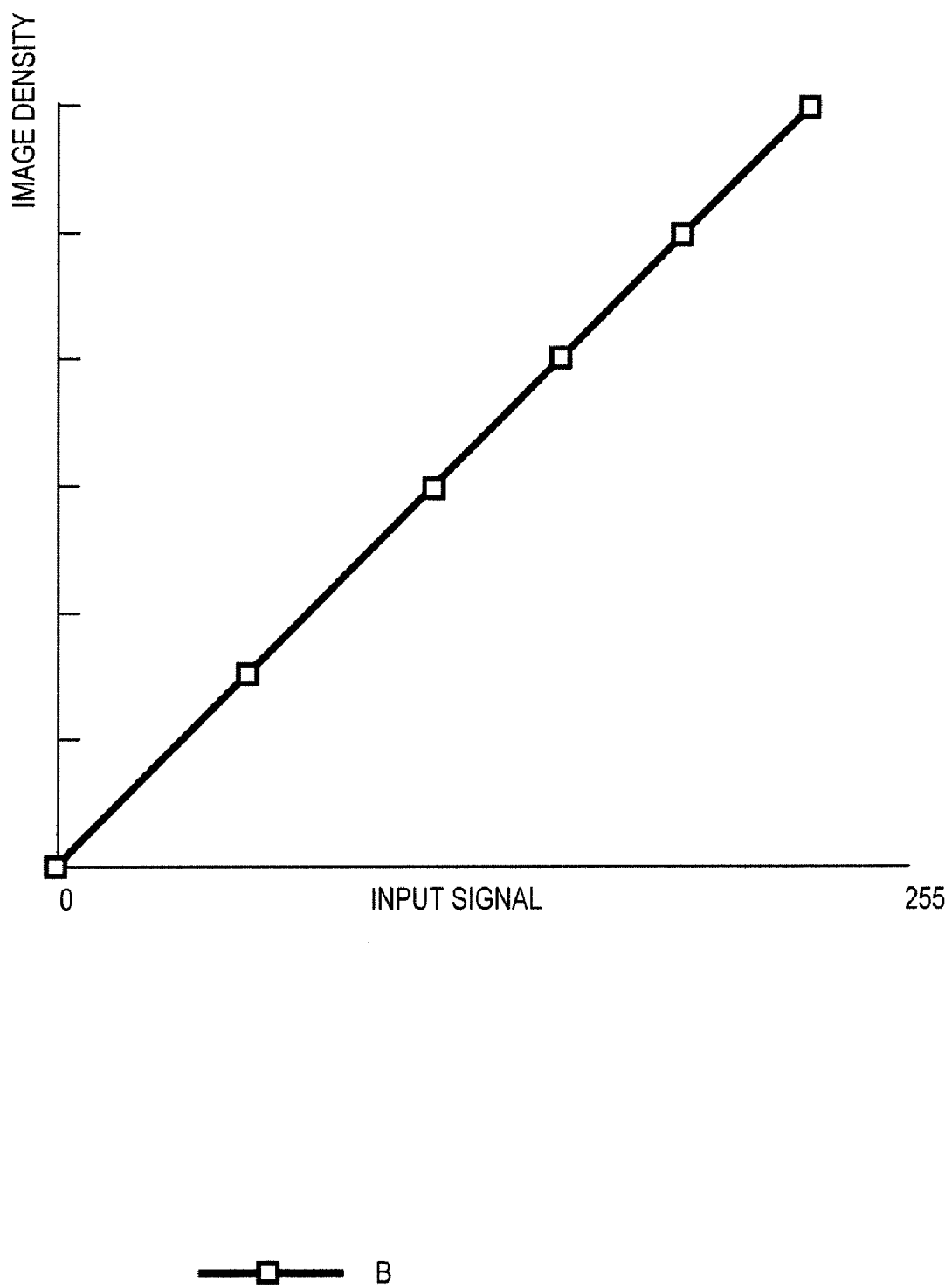
FIG. 20 is a graph for explaining an example of a gradation characteristic in the case in which the number of boundary values is optimized (the number of boundary values=5).

For example, if a boundary value table including boundary values "0", "76", "134", "182", "224", and "255" is applied to the print head B with the number of boundary values "6", an ideal gradation characteristic shown in FIG. 20 can be realized.

Figure 21:
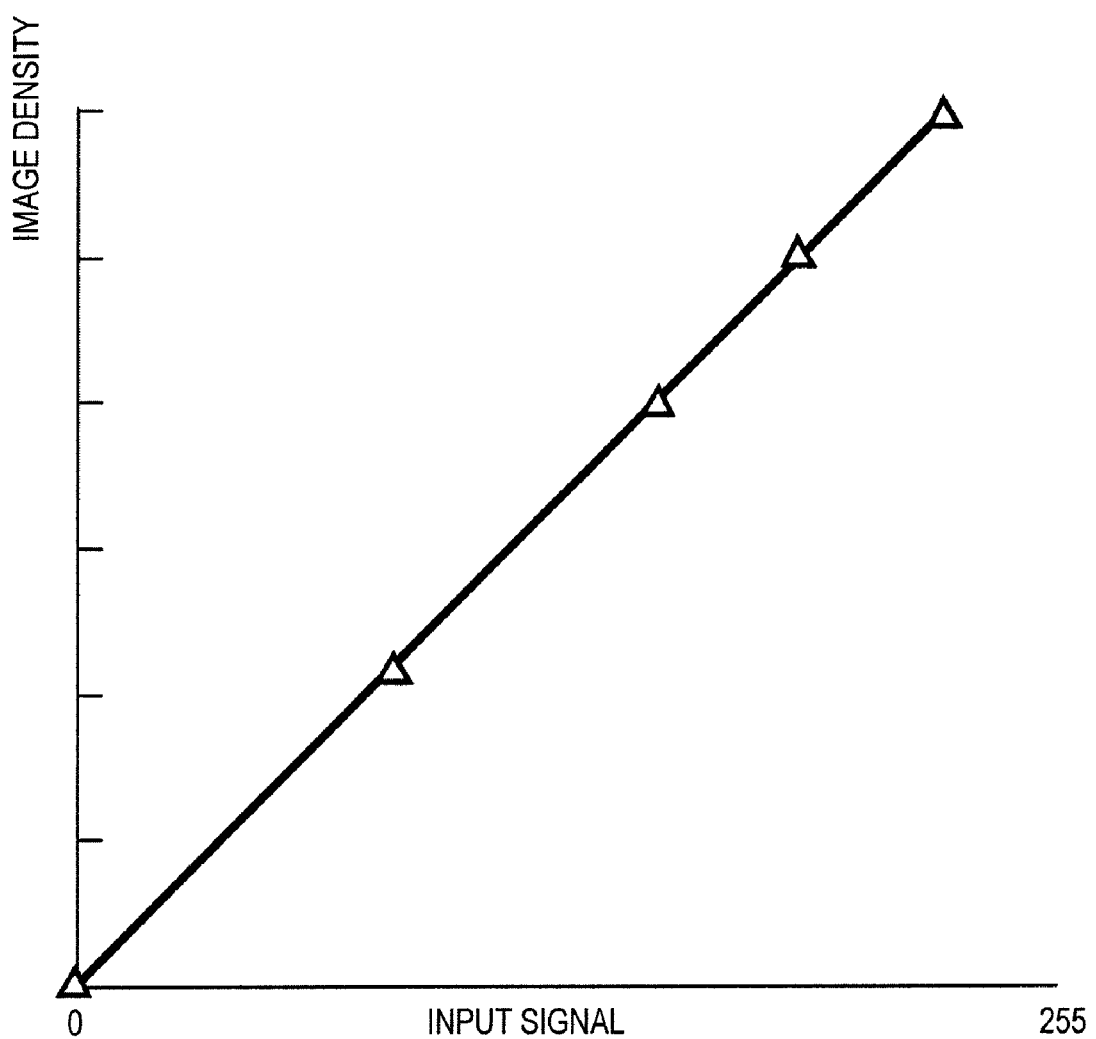
FIG. 21 is a graph for explaining an example of a gradation characteristic in the case in which the number of gradation values is optimized (the number of boundary values=4).

For example, if a boundary value table including boundary values "0", "100", "169", "220", and "255" is applied to the print head C with the number of boundary values "5", an ideal gradation characteristic shown in FIG. 21 can be realized.

In FIGS. 19 to 21, the ideal gradation characteristics are shown in a linear shape. However, a shape of the ideal gradation characteristics is not limited to the linear shape and may be a curved shape. In that case, a boundary value table in which boundary values are set to be located on an ideal curve is used.

Lastly, an example of a boundary value table by number of boundary values is described. FIG. 22 is an example of a boundary value table with the number of boundary values "4", FIG. 23 is an example of a boundary value table with the number of boundary values "6", and FIG. 24 is an example of a boundary value with the number of boundary values "5".

Various methods of setting a threshold are possible. In this embodiment, an intermediate value of boundary values is used. For example, when a value obtained by adding an error calculated from peripheral pixels to an input signal is smaller than the threshold, an input value is converted into the boundary value L (a boundary value lower than the threshold). As a result, the number of ejections (the output value L) corresponding to the boundary value L is outputted.

On the other hand, when a value obtained by adding an error calculated from peripheral pixels to an input signal is larger than the threshold, an input value is converted into the boundary value H (a boundary value larger than the threshold). As a result, the number of ejections (the output value H) corresponding to the boundary value H is outputted.

(a-3) Effect of Optimization

As described above, if the method of writing selection information in the storage area in advance in order to select an optimum boundary value table corresponding to the print heads is adopted, it is possible to bring gradation characteristics of the respective print heads closer to an ideal state without reducing the number of gradations.

If selection information reflects maximum densities of the print heads and directly or indirectly designates the number of boundary values, even if fluctuation is present in ejection abilities of the print heads, it is possible to set maximum densities of the respective inks reproduced on a print medium substantially the same. As a result, it is possible to realize a high print quality regardless of the ejection abilities of the print heads.

(b) System Example 2

In explanation of this system example, a boundary value table optimum for the respective print heads is created on the basis of information read from the print heads.

(b-1) System Configuration

Figure 25:
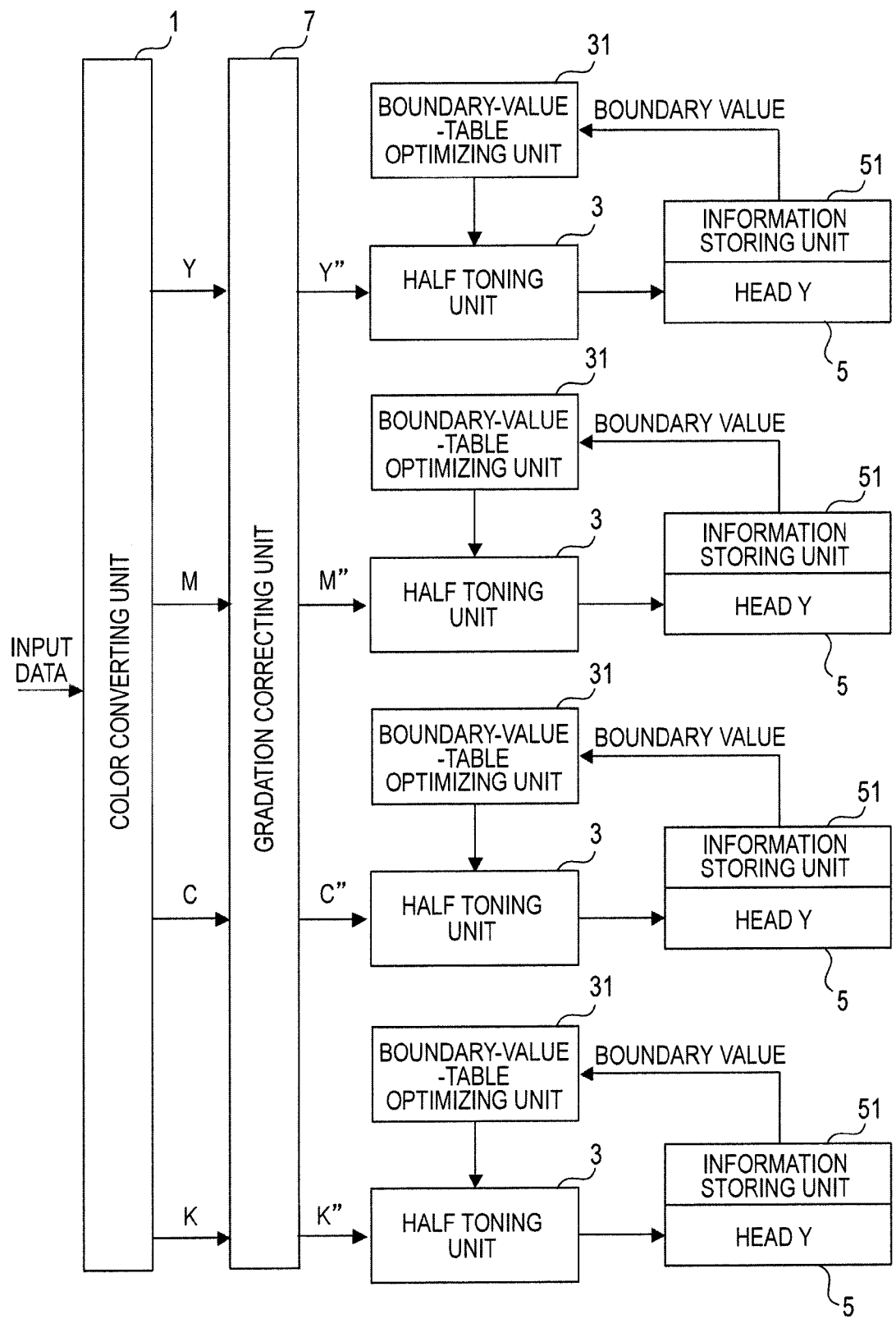
FIG. 25 is a diagram showing an example of a configuration of a printing apparatus corresponding to a system example 2.

A system example of a printing apparatus is shown in FIG. 25. In FIG. 25, units corresponding to those shown in FIG. 13 are denoted by the identical reference numerals.

The printing apparatus shown in FIG. 25 includes the color converting unit 1, the gradation correcting unit 7, the half toning units 3, the print heads 5 (the information storing units 51), and boundary-value-table optimizing units 31.

This printing system is different from the system example 1 in that plural sets of boundary values necessary for creation of a boundary value table are stored in the information storing units 51 of the print heads 5 by print condition. Therefore, the boundary-value-table optimizing units 31 realize a function of creating a boundary value table on the basis of a set of boundary values read out according to a print condition.

In the case of this embodiment, a print condition is determined according to a combination of a type of paper, a print mode, and the like. The print mode is determined according to a combination of resolution, printing speed, an image quality, a print content, and other items.

Incidentally, the resolution is designated as, for example, high resolution, resolution, and the like. The printing speed is designated as, for example, high speed, low speed, and the like. The image quality is designated as, for example, a high image quality, a normal image quality, draft, and the like. The print content is designated as, for example, a photograph, a document, and the like.

However, a set of boundary values are not always stored for all print conditions. In such a case, necessary one set of boundary values are created on the basis of a set of boundary values stored for a representative print condition.

Figure 26:
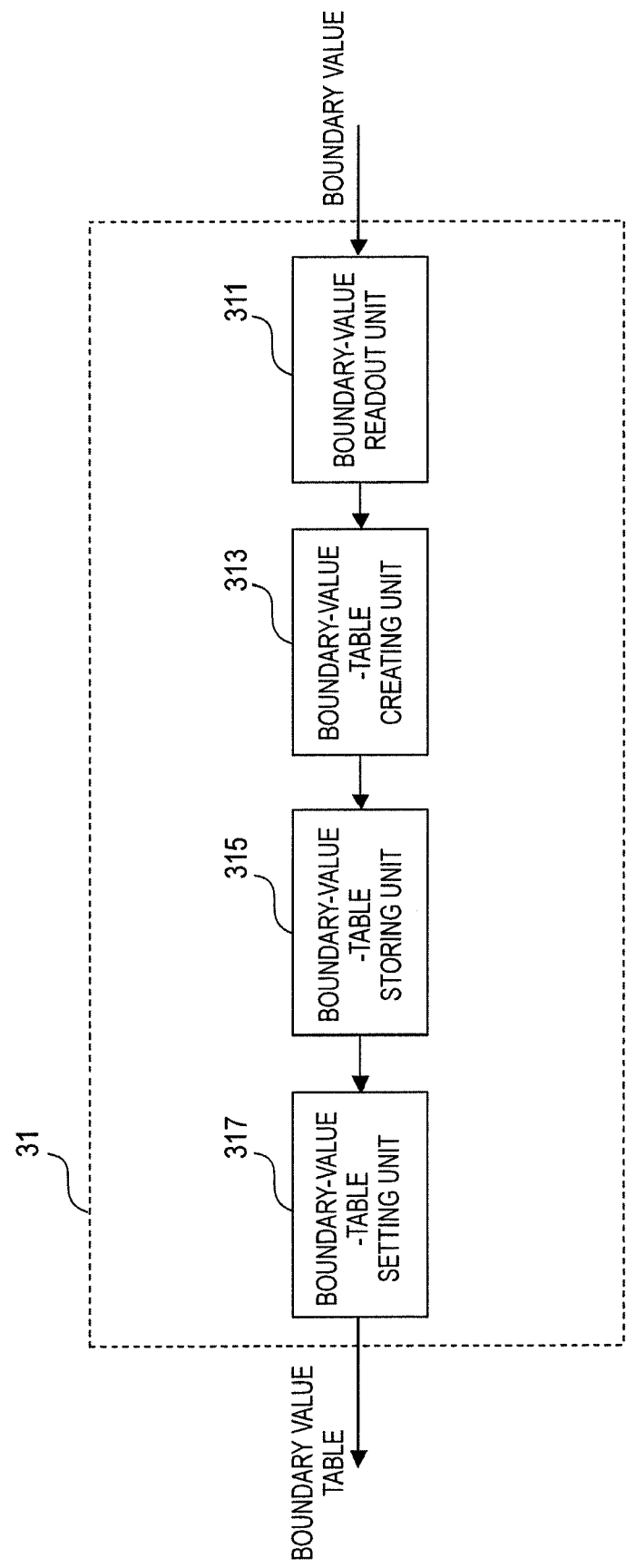
FIG. 26 is a diagram showing an example of a configuration of a boundary-value-table optimizing unit.

An example of a de tailed configuration of the boundary-value-table optimizing unit 31 suitable for this system example is shown in FIG. 26.

The boundary-value-table optimizing unit 31 includes a boundary-value readout unit 311, a boundary-value-table creating unit 313, a boundary-value-table storing unit 315, and a boundary-value-table setting unit 317.

The boundary-value readout unit 311 executes processing for reading out a set of boundary values matching a print condition from the information storing unit 51 of the print head 5. In this case, as in the above case, the set of boundary values are stored by the head as, for example, ROM data and resistances of variable resistors when the printing apparatus is shipped from a factory.

The set of boundary values are set for, for example, the Y ink, the M ink, the C ink, and the K ink. When nozzle rows corresponding to the respective ink colors are formed by bonding plural nozzle chips as in the print head of the line head type, a set of boundary values can also be set by each nozzle chip.

Incidentally, a readout mechanism corresponding to a storage form of the boundary values is adopted in the boundary-value readout unit 311. For example, when the selection information is stored as ROM data, the boundary-value readout unit 311 includes a ROM reader.

The boundary-value-table creating unit 313 executes processing for creating a boundary value table on the basis of the read-out set of boundary values.

Specifically, thresholds and output values associated with the boundary values are determined as described below to form a boundary value table in which the thresholds and the output values are associated with all input signal values.

First, a threshold is generated as described below.

The threshold is determined as an intermediate value of two boundary values adjacent to each other among the set of boundary values arranged in order of magnitude. A smaller one of the adjacent two boundary values is set as the boundary value L and a larger one is set as the boundary value H. In this case, the threshold is basically calculated on the basis of the following formula. Decimals of a calculation result are rounded off to an integer.

$$\text{Threshold} = \text{boundary value } L + (\text{boundary value } H - \text{boundary value } L)/2$$

In this case, for example, a threshold corresponding to a boundary value "0" and a boundary value "63" is calculated as "32" from "0+(63−0)/2".

Similarly, for example, a threshold corresponding to a boundary value "63" and a boundary value "127" is calculated as "95" from "63+(127−63)/2".

In the boundary value table, when a value obtained by adding errors that occur in peripheral pixels to input signal values "1" to "63" is smaller than the threshold "32", the boundary value L (i.e., "0") is associated with the input signal values and, when the value is larger than the threshold "32", the boundary value H (i.e., "63") is associated with the input signal values. Association of boundary values is executed in the same manner for other input signal values.

Incidentally, in processing performed when the value obtained by adding the errors that occur in the peripheral pixels to the input signal values coincide with the threshold "32", the signal values are associated with the boundary value L or the boundary value H according to prior setting.

The output value is generated as described below. The number of ink droplets forming one pixel, i.e., "0", "1", "2", ... are associated with boundary values arranged in ascending order. A maximum value of output values is associated with the number of boundary values.

The boundary-value-table creating unit 313 creates boundary value tables shown in FIGS. 22 to 24 according to such a procedure.

The boundary-value-table storing unit 315 is a storage area that stores the created boundary value table. The boundary-value-table storing unit 315 is desirably a nonvolatile storage area in terms of elimination of necessity of recalculation. For example, a semiconductor storage device, a magnetic storage device, and other storage media are used. It goes without saying that, during power supply, when boundary values are read out from the print head 5 to create a boundary value table again, a volatile storage medium can also be used as the storage area.

The boundary-value-table setting unit 317 is a processing device that sets the created boundary value table for reference by the half toning unit 3. It goes without saying that the boundary value table is set by ink color. When nozzle rows corresponding to the respective ink colors are formed by bonding plural nozzle chips as in the print head of the line head type, the boundary value table can also be set by each nozzle chip.

As a result, regardless of fluctuation in gradation characteristics peculiar to the print heads, image density reproduced on a print medium through the multi-value error diffusion processing by the half toning unit 3 can be brought closer to an ideal gradation characteristic.

(b-2) Effect of Optimization

As described above, if the method of writing optimum boundary values corresponding to the print heads in the information storing unit 51 in advance is adopted, it is possible to create an optimum boundary value table in the printing system and bring gradation characteristics of the respective print heads closer to an ideal state.

If the number of boundary values stored in the storage area is set by reflecting maximum density of the print heads, even if fluctuation is present in ejection abilities of the print heads, it is possible to set maximum densities of the respective inks reproduced on a print medium substantially the same. As a result, it is possible to realize a high print quality regardless of the ejection abilities of the print heads.

(c) System Example 3

In explanation of this system example, a boundary value table optimum for the respective print heads is created on the basis of boundary value determination information read from the print heads.

(c-1) System Configuration

Figure 27:
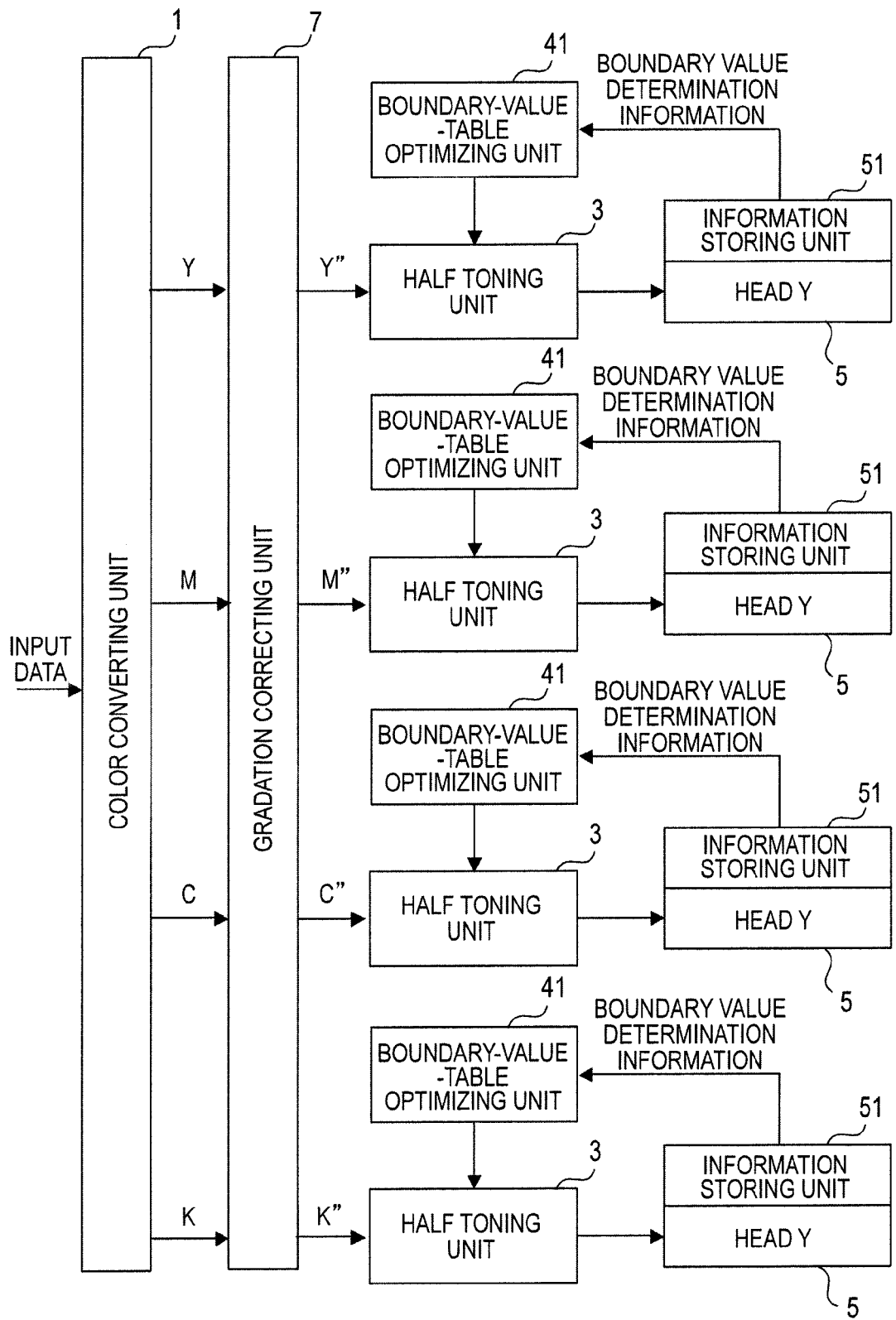
FIG. 27 is a diagram showing an example of a configuration of a printing apparatus corresponding to a system example 3.

A system example of a printing apparatus is shown in FIG. 27. In FIG. 27, units corresponding to those shown in FIG. 13 are denoted by the identical reference numerals.

The printing apparatus shown in FIG. 27 includes the color converting unit 1, the gradation correcting unit 7, the half toning units 3, the print heads 5 (the information storing units 51), and boundary-value-table optimizing units 41.

This printing system is different from the system example 1 in that information for determining a set of boundary values necessary for creation of a boundary value table is stored in the information storing units 51 of the print heads 5 by print condition.

Therefore, the boundary-value-table optimizing units 41 realize both a function of determining boundary values on the basis of boundary value determination information matching a print condition and a function of creating a boundary value table on the basis of a determined set of boundary values.

The boundary value determination information means information such as information representing an average nozzle diameter, print density, and characteristics of print heads. In the explanation of the system example 1, a boundary value table is directly selected on the basis of these kinds of information. However, in this system example, a system for determining a set of boundary values on the basis of the same kind of information is adopted. Operations after the set of boundary values are determined is the same as those in the system example 2.

Figure 28:
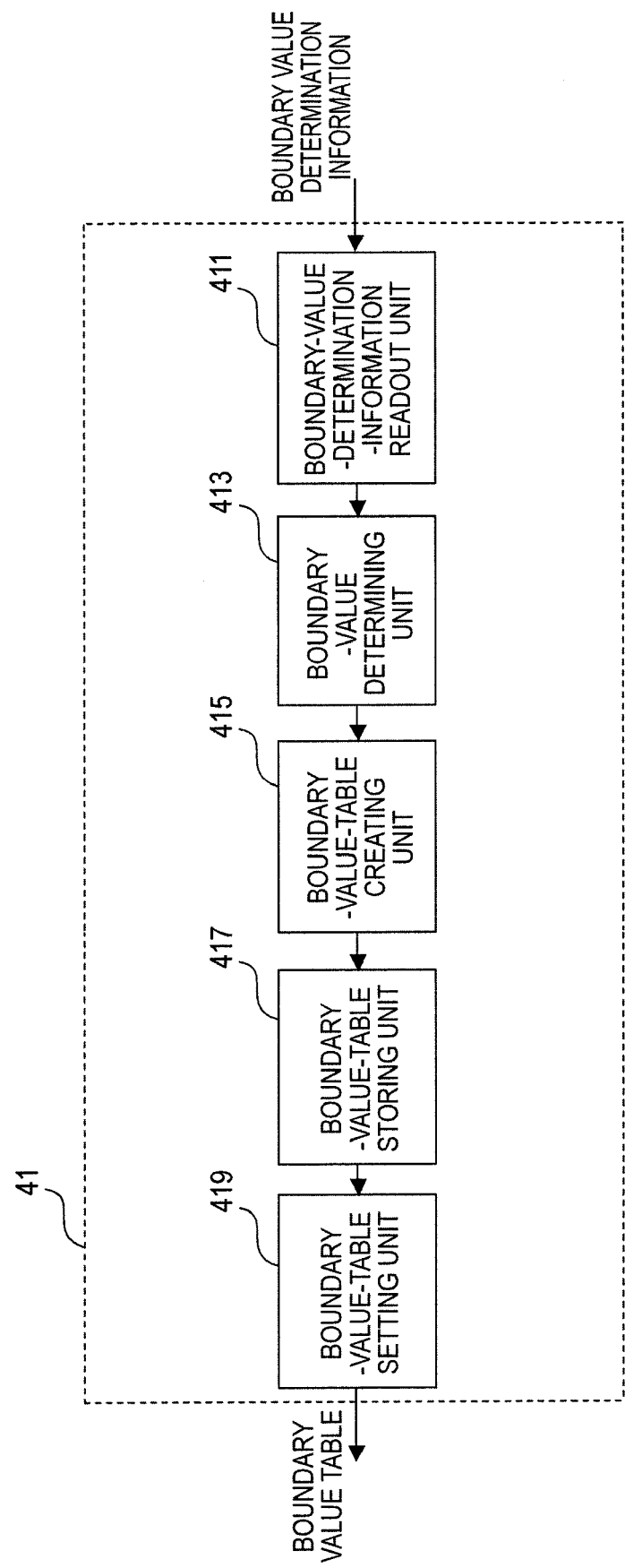
FIG. 28 is a diagram showing an example of a configuration of a boundary-value-table optimizing unit.

An example of a detailed configuration of the boundary-value-table optimizing unit 41 suitable for this system example is shown in FIG. 28.

The boundary-value-table optimizing unit 41 includes a boundary-value-determination-information readout unit 411, a boundary-value determining unit 413, a boundary-value-table creating unit 415, a boundary-value-table storing unit 417, and a boundary-value-table setting unit 419.

The boundary-value-determination-information readout unit 411 executes processing for reading out boundary value determination information from the information storing unit 51 of the print head 5. In this case, as in the above cases, the boundary value determination information is stored by head as, for example, ROM data and resistances of variable resistors when the printing apparatus is shipped from a factory.

As in the system examples described above, the boundary value determination information in this system example is set for, for example, the Y ink, the M ink, the C ink, and the K ink. When nozzle rows corresponding to the respective ink colors are formed by bonding plural nozzle chips as in the print head of the line head type, boundary value determination information can also be set by each nozzle chip.

A readout mechanism corresponding to a storage form of boundary values is adopted as the boundary-value-determination-information readout unit 411. For example, when the selection information is stored as ROM data, the boundary-value-determination-information readout unit 411 includes a ROM reader.

Figure 29:
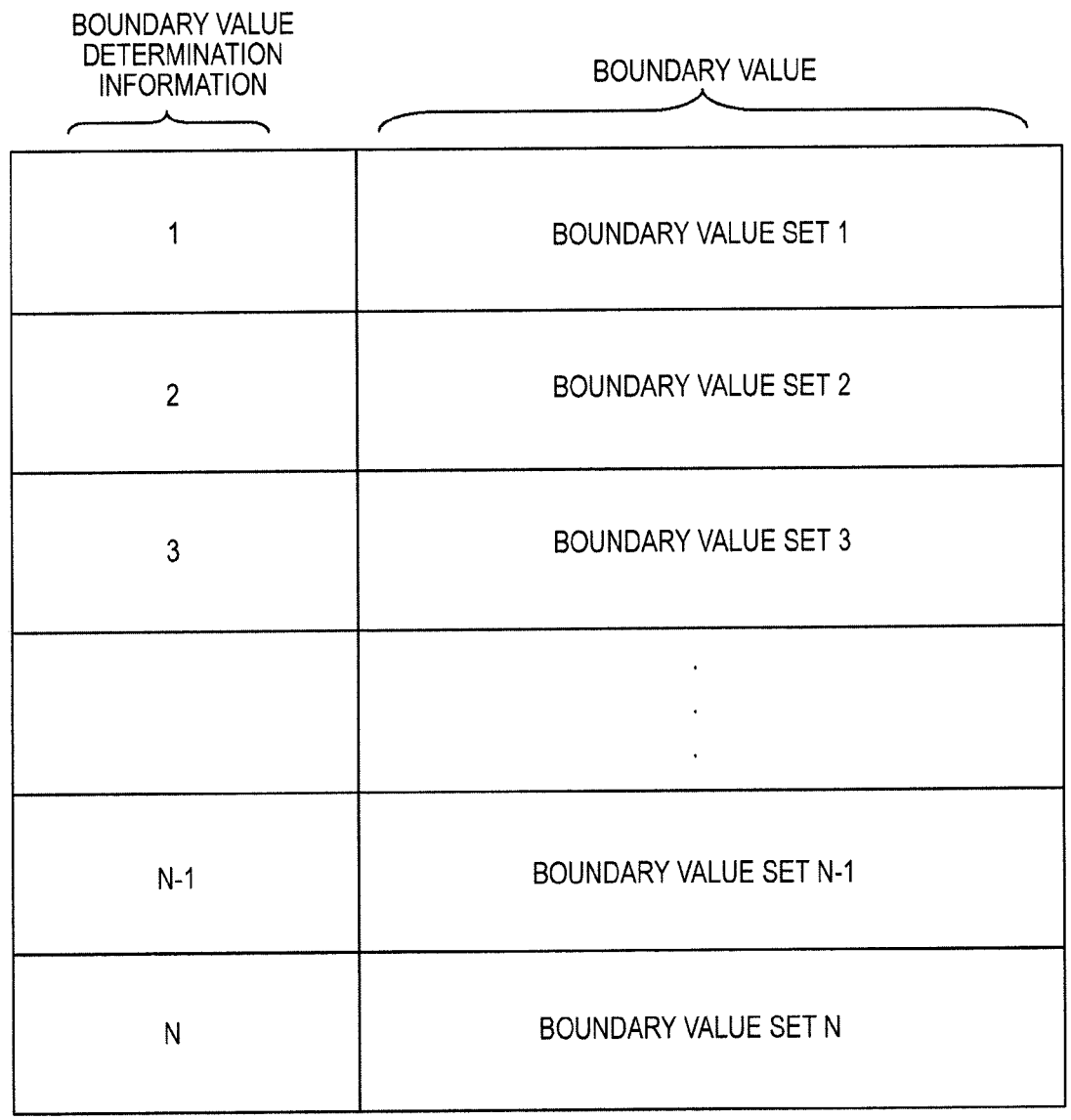
FIG. 29 is a diagram showing an example of a table in which boundary value determination information and boundary values are associated.

The boundary-value determining unit 413 executes processing for determining a set of boundary values for multi-value error diffusion on the basis of the read-out information. For example, the boundary-value determining unit 413 determines a set of boundary values corresponding to boundary value determination information with reference to a correspondence table shown in FIG. 29.

A method of determining boundary values when the boundary value determination information is print density is specifically explained. It is assumed that, as print densities corresponding to levels 1 to 6, "0.51", "0.98", "1.36", "1.60", "1.88", and "2.01" are stored. It is assumed that an ideal relation between a gradation value and density is given by, for example, "density=gradation value×0.0078".

In this case, gradation values corresponding to the respective densities can be calculated by "gradation value=density÷0.0078".

The boundary-value determining unit 413 calculates an ideal gradation value by substituting print density read out as boundary value determination information in "gradation value=density÷0.0078". This gradation value is used as a "boundary value" defining a boundary value table.

Therefore, when print densities are given in the example described above, boundary values corresponding thereto are calculated as "65", "126", "174", "205", "241", and "257".

However, in the case of this embodiment, since a maximum value of the boundary values is "255", the boundary-value determining unit 413 compares the level 5 and the level 6 and sets a boundary value at the level 6, which is closer to "255", to "255".

When stored print densities are "0.8", "1.4", "1.8", "2.1", "2.2", and "2.3", boundary values obtained by the calculation are "103", "179", "231", "269", "282", and "294". In this case, the boundary-value determining unit 413 sets a boundary value at the level 4 to "255" and does not use boundary values at the level 5 and the level 6.

The boundary-value-table creating unit 415 executes processing for creating a boundary value table on the basis of a set of boundary values calculated in this way. In this case, the boundary-value-table creating unit 415 determines thresholds and output values in a procedure same as that in the system example 2 and creates a boundary value table in which the thresholds and the output values are associated with all input signal values.

The boundary-value-table storing unit 417 is a storage area that stores the created boundary value table. The boundary-value-table storing unit 417 is desirably a nonvolatile storage area in terms of a reduction in loads of recalculation. For example, a semiconductor storage device, a magnetic storage device, and other storage media are used. It goes without saying that, during power supply, when boundary values are read out from the print head 5 to create a boundary value table again, a volatile storage medium can also be used as the storage area.

The boundary-value-table setting unit 419 is a processing device that sets the created boundary value table for reference by the half toning unit 3. It goes without saying that the boundary value table is set by ink color (by attribute of the ink).

When nozzle rows corresponding to the respective ink colors are formed by bonding plural nozzle chips as in the print head of the line head type, the boundary value table can also be set by each nozzle chip.

As a result, regardless of fluctuation in gradation characteristics peculiar to the print heads, image density reproduced on a print medium through the multi-value error diffusion processing by the half toning unit 3 can be brought closer to an ideal gradation characteristic.

(c-2) Effect of Optimization

As described above, if the method of writing optimum boundary values corresponding to the print heads in the information storing unit 51 in advance is adopted, it is possible to create an optimum boundary value table in the printing system and bring gradation characteristics of the respective print heads closer to an ideal state.

If the boundary value determination information stored in the information storing unit 51 is set by reflecting maximum density of the print heads, even if fluctuation is present in ejection abilities of the print heads, it is possible to set maximum densities of the respective inks reproduced on a print medium substantially the same. As a result, it is possible to realize a high print quality regardless of the ejection abilities of the print heads.

(d) System Example 4

In explanation of this system example, an optimum boundary value is determined on the basis of actual print results (measured densities) of the respective heads and a boundary value table for bringing a gradation characteristic of the print heads corresponding to this boundary value closer to an ideal characteristic is created.

Therefore, in this system example, the information storing units 51 do not have to be mounted or formed in the print heads 5.

(d-1) System Configuration

Figure 30:
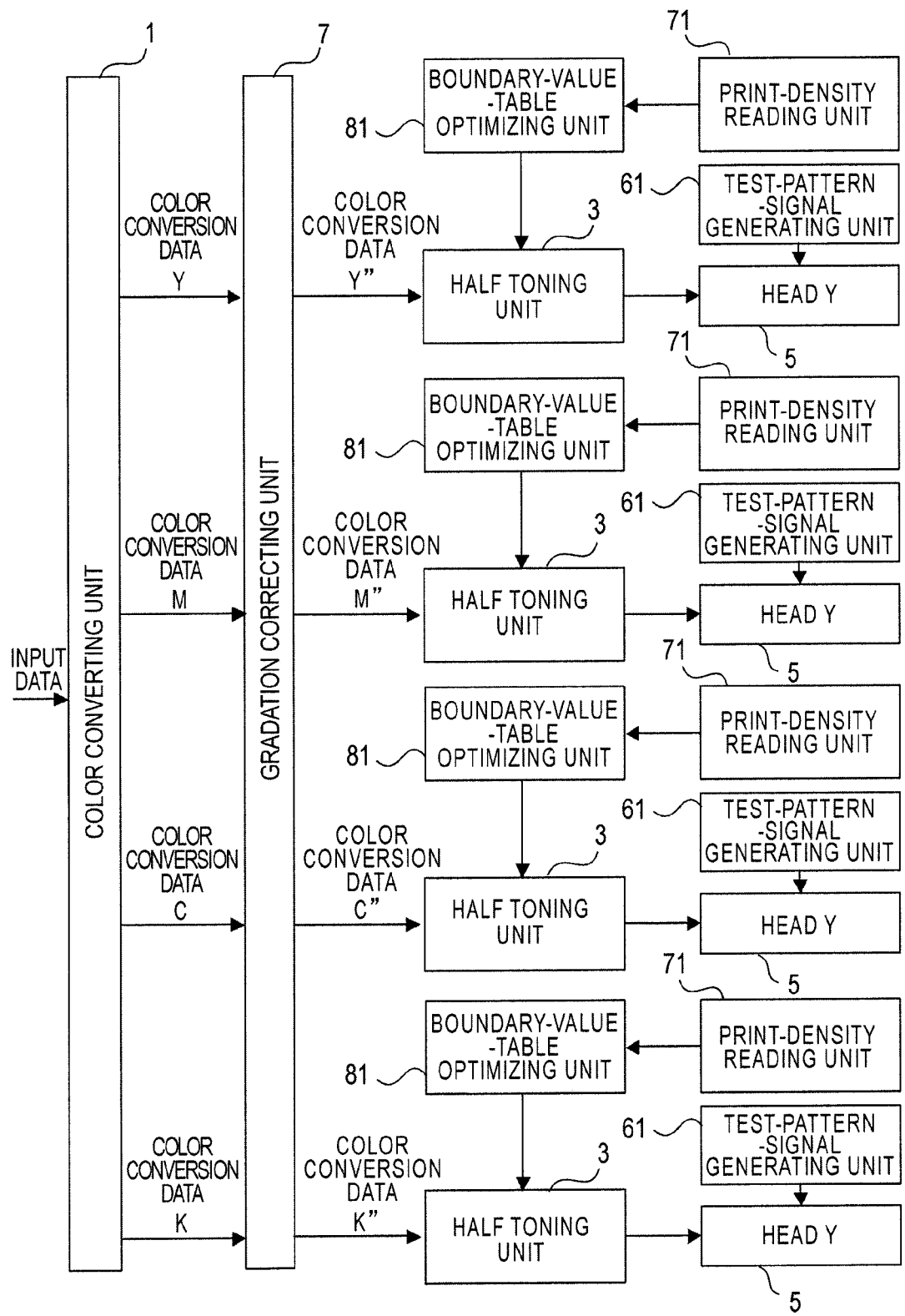
FIG. 30 is a diagram showing an example of a configuration of a printing apparatus corresponding to a system example 4.

A system example of a printing apparatus is shown in FIG. 30. In FIG. 30, units corresponding to those shown in FIG. 13 are denoted by the identical reference numerals.

The printing apparatus shown in FIG. 30 includes the color converting unit 1, the gradation correcting unit 7, the half toning units 3, the print heads 5, test-pattern-signal generating units 61, print-density reading units 71, and boundary-value-table optimizing units 81.

A configuration peculiar to this printing system is that the test-pattern-signal generating units 61 and the print-density reading units 71 are mounted anew and that the boundary-value-table optimizing units 81 execute a function of determining optimum boundary values according to print densities actually measured and creating a boundary value table on the basis of a determined set of boundary values.

The test-pattern-signal generating units 61 are processing devices that generate test pattern signals used for determination of boundary values for multi-value error diffusion.

In the case of this embodiment, the test-pattern-signal generating units 61 generate test patterns by print condition. However, only one kind of a test pattern or representative test patterns can also be generated.

Basically, a pattern corresponding to a boundary value from which a characteristic of a print head itself can be found is used as a test pattern signal. For example, when the print head can eject four ink droplets into one pixel, four kinds of patterns, i.e., a solid pattern at a level 1, a solid pattern at a level 2, a solid pattern at a level 3, and a solid pattern at a level 4 are generated. The number of levels corresponds to the number of ink droplets.

Figure 31A:
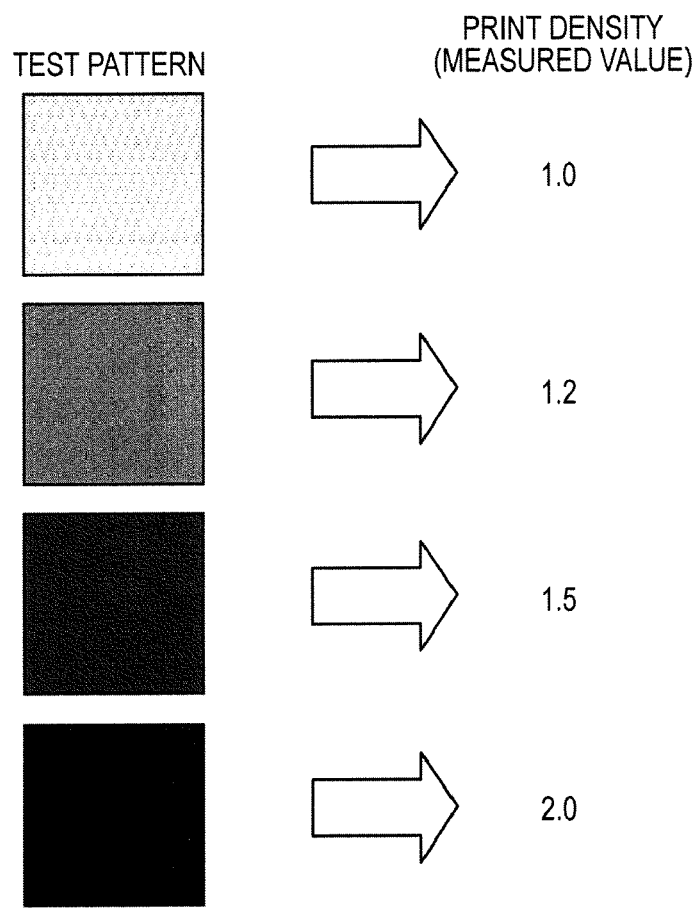
FIG. 31 is a diagram for explaining a relation between test patterns and print densities.
Figure 31B:
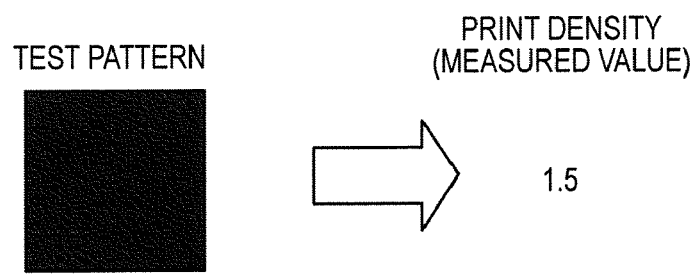

An example of test patterns corresponding to this case is shown in (A) in FIG. 31. However, as in the case in which a set of boundary values are prepared in the boundary-value-table optimizing units 81 in advance, when it is possible to specify a gradation characteristic simply by observing print densities of a part of boundary values, only a part of the solid patterns may be representatively used. An example of such a solid pattern is shown in (B) in FIG. 31. (B) in FIG. 31 is an example in the case in which a saturated state of a high-gradation portion is set as an observation object. In other words, in (B) in FIG. 31, the solid pattern at the level 3 is selected.

The print-density reading units 71 are processing devices that optically read print densities of test patterns and output information for determining boundary values. For example, scanners are used as the print-density reading units 71. Therefore, this printing apparatus is suitable for a multi-function peripheral mounted with scanners besides print heads. However, the print-density reading units 71 can also be realized as devices externally attached to the printing apparatus and configured to capture a scan result through a communication terminal of the printing apparatus.

The print-density reading units 71 output, for example, print densities measured for the respective test patterns to the boundary-table optimizing units 81.

In this embodiment, it is assumed that an output value of a scanner is given in, for example, 8 bits (0 to 255 (density of a thicker image is larger)). In this case, it is assumed that print density is calculated as "output value of the scanner×0.01".

For example, print densities corresponding to test patterns are calculated as shown in FIG. 31. In the case of (A) in FIG. 31, print density of a test pattern corresponding to the level 1 is calculated as "1.0". Print density of a test pattern corresponding to the level 2 is calculated as "1.2". Print density of a test pattern corresponding to the level 3 is calculated as "1.5". Print density of a test pattern corresponding to the level 4 is calculated as "2.0". Incidentally, in (B) in FIG. 31, there is only one test pattern. In this case, print density of the test pattern is calculated as "1.5".

However, information same as that in the other system examples described above may be generated rather than the print density and the information may be given to the boundary-value-table optimizing units 81. In other words, selection information of a boundary value table, a set of boundary values, and information for determining the set of boundary values may be given to the boundary-value-table optimizing units 81.

Figure 32:
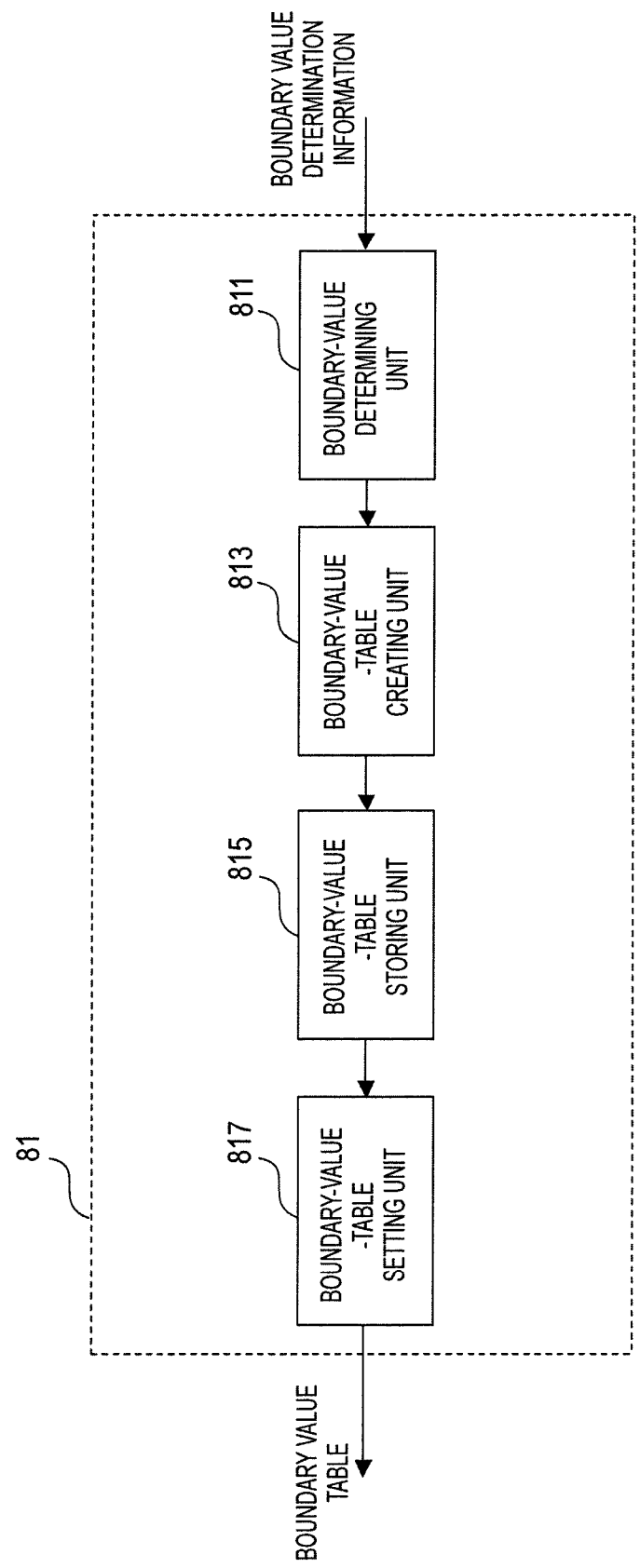
FIG. 32 is a diagram showing an example of a configuration of a boundary-value-table optimizing unit.

An example of a detailed configuration of the boundary-value-table optimizing unit 81 suitable for this system example is shown in FIG. 32.

The boundary-value-table optimizing unit 81 includes a boundary-value determining unit 811, a boundary-value-table creating unit 813, a boundary-value-table storing unit 815, and a boundary-value-table setting unit 817.

In the case of this example, the boundary-value determining unit 811 executes processing for determining a set of boundary values for multi-value error diffusion on the basis of print density. For example, the boundary-value determining unit 811 determines a set of boundary values corresponding to print density with reference to a correspondence table shown in FIG. 33.

For example, when print densities corresponding to test patterns are measured as "0.51", "0.98", "1.36", "1.60", "1.88", and "2.01", the boundary-value determining unit 811 substitutes the measured print densities in a relational expression given by "gradation value=density÷0.0078" and calculates boundary values corresponding thereto. It goes without saying that this relational expression is used when an ideal relation between a gradation value and density is given by "density=gradation value×0.0078" and, when other relational expressions hold, the other relational expressions are used.

When the measured densities are those in the example described above, the boundary-value determining unit 811 outputs "65", "126", "174", "205", "241", and "257" as boundary values. However, in the case of this embodiment, since a maximum value of the boundary values is "255", the boundary-value determining unit 811 compares the level 5 and the level 6 and sets a boundary value at the level 6, which is closer to "255", to "255".

When the measured print densities are "0.8", "1.4", "1.8", "2.1", "2.2", and "2.3", "103", "179", "231", "269", "282", and "294" are calculated as boundary values. In this case, the boundary-value determining unit 811 sets a boundary value at the level 4 to "255" and does not use boundary values at the level 5 and the level 6.

The boundary-value-table creating unit 813 executes processing for creating a boundary value table on the basis of the read-out set of boundary values. In this case, the boundary-value-table creating unit 813 determines thresholds and output values in a procedure same as that in the system example 2 and creates a boundary value table in which the thresholds and the output values are associated with all input signal values.

The boundary-value-table storing unit 815 is a storage area that stores the created boundary value table. The boundary-value-table storing unit 815 is desirably a nonvolatile storage area in terms of a reduction in loads of recalculation. For example, a semiconductor storage device, a magnetic storage device, and other storage media are used. It goes without saying that, during power supply, when boundary values are read out from the print head 5 to create a boundary value table again, a volatile storage medium can also be used as the storage area.

The boundary-value-table setting unit 817 is a processing device that sets the created boundary value table for reference by the half toning unit 3. It goes without saying that, when nozzle rows corresponding to the respective ink colors are formed by bonding plural nozzle chips as in the print head of the line head type, the boundary value table can also be set by each nozzle chip.

As a result, regardless of fluctuation in gradation characteristics peculiar to the print heads, image density reproduced on a print medium through the multi-value error diffusion processing by the half toning unit 3 can be brought closer to an ideal gradation characteristic.

(d-2) Effect of Optimization

As described above, test patterns are given to the print heads to detect print characteristics (i.e., print densities) and an optimum boundary value table is created according to results of the detection. Consequently, even when characteristics of the print heads change with time, it is possible to execute a print operation in an optimum state. If this function is used, it is also possible to optimize a boundary value table to a gradation characteristic at a point of printing.

In this case, as in the above case, when boundary value determination information stored in the information storing units 51 is set by reflecting maximum density of the print heads, even if fluctuation is present in ejection abilities of the print heads, it is possible to set maximum densities of the respective inks reproduced on a print medium substantially the same. As a result, regardless of ejection abilities of the print heads, a high print quality can be realized.

(B) Application Example of the Printing Apparatus

Lastly, an application example of the printing apparatus is described.

The printing apparatus described above can be applied to products for various uses.

Figure 34:
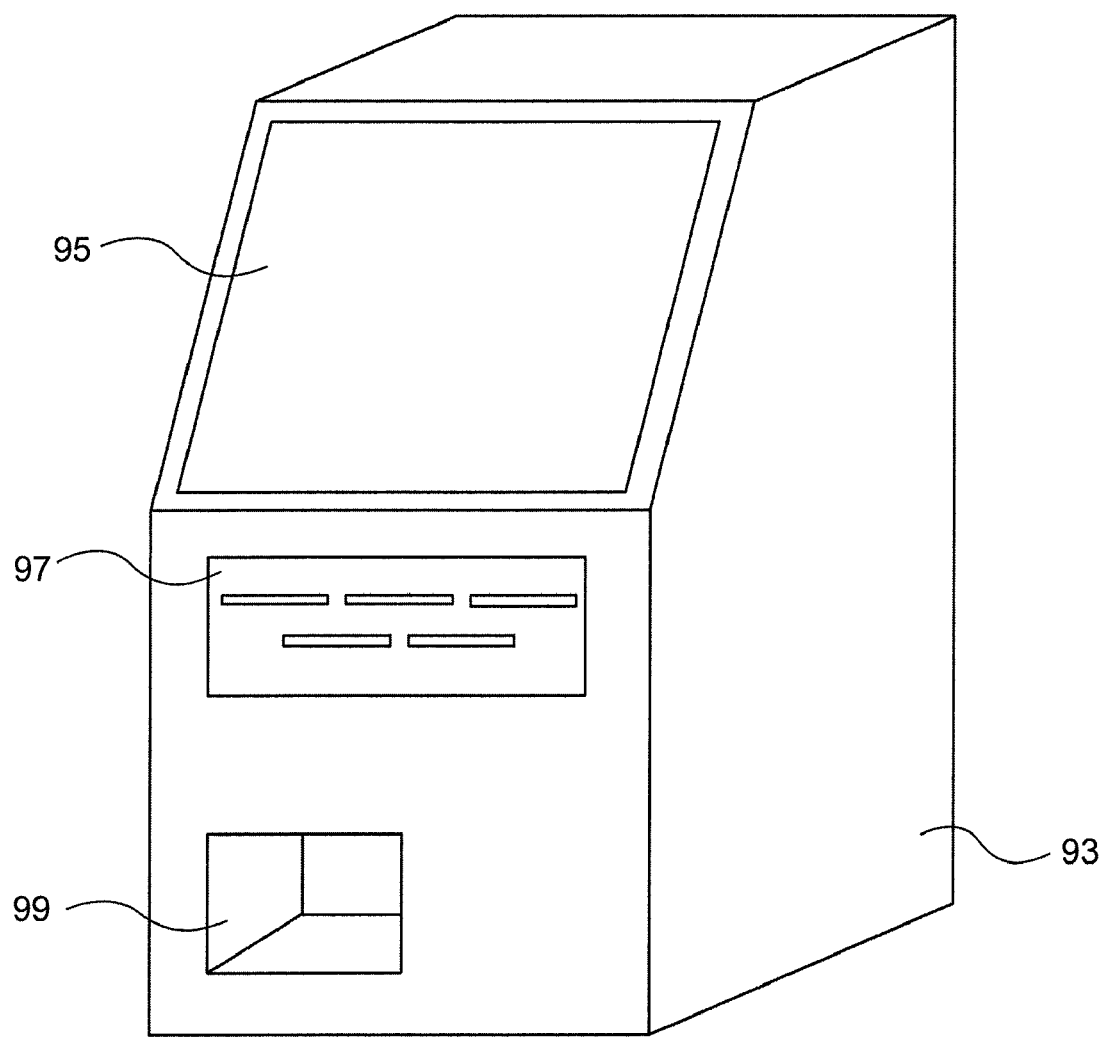
FIG. 34 is a diagram for explaining an example of an appearance of a kiosk-type printing apparatus.

For example, the printing apparatus can be applied to a kiosk-type printing apparatus. A general external structure of the kiosk-type printing apparatus is shown in FIG. 34. A printing apparatus 91 of this type is mounted with a display area 95 for operation, a media inserting port 97, and a discharge port 99 on a front surface of a housing 93.

Figure 35:
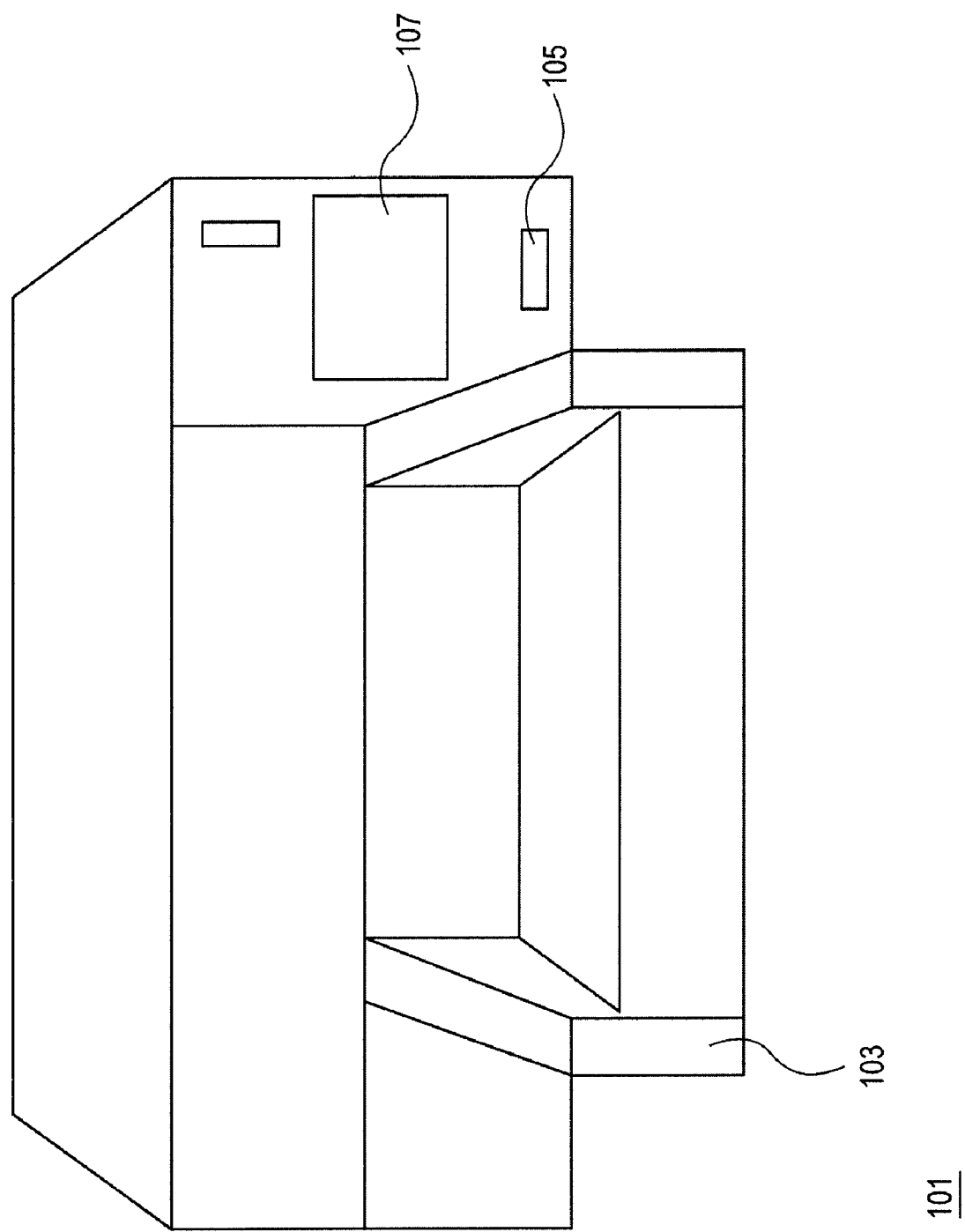
FIG. 35 is a diagram for explaining an example of an appearance of a printing apparatus for home use.

For example, the printing apparatus can also be applied to a product mainly for home users. A general external structure of a printing apparatus of this type is shown in FIG. 35. A printing apparatus 101 of this type is mounted with a media inserting port 105 and a display area 107 on a front surface of a housing 103.

For example, the printing apparatus can also be applied to a printing apparatus used in medical facilities. In the case of the printing apparatus used in the medical facilities, the printing apparatus is used for printing of monochrome images such as X-ray photographs and color images such as MRI images. In particular, in the printing apparatus proposed by the inventor, gradation information can be reproduced without being practically lost and, in addition, an extremely high image quality can be expected because there is no influence of fluctuation in maximum densities.

(C) Other Embodiments (a) In the explanation of the embodiment described above, the plural sets of boundary value tables are stored for selection.

However, these boundary value tables may be captured through an external storage medium a posteriori. In other words, these boundary value tables may be added or rewritten a posteriori. A mechanism for downloading these boundary value tables from a server of a manufacturer or the like through network communication such as the Internet may be adopted.

(b) In the explanation of the embodiment described above, the table in which selection information and boundary value tables are associated with each other is stored in the printing apparatus.

However, the contents of this table may also be added or rewritten a posteriori. A mechanism for downloading the contents of the table from a server of a manufacturer or the like through network communication such as the Internet may be adopted.

(c) In the explanation of the embodiment described above, the table in which boundary value determination information and boundary values are associated with each other is stored in the printing apparatus.

However, the contents of this table may also be added or rewritten a posteriori. A mechanism for downloading the contents of the table from a server of a manufacturer or the like through network communication such as the Internet may be adopted.

(d) In the embodiment described above, the function for selecting or creating a boundary value table is explained mainly from a functional aspect. However, it goes without saying that an equivalent function can also be realized as either hardware or software.

All of these processing functions are not only realized by hardware or software. A part of the processing functions may be realized by using hardware or software. In other words, the hardware and the software may be combined.

(e) In the explanation of the embodiment described above, the technique according to the present invention is applied to a printing apparatus that ejects ink droplets.

However, the technique for ejecting liquid described above can also be applied to a liquid ejecting head and a liquid ejecting device that eject various dyes as liquid droplets. The technique can also be applied to a liquid ejecting head and a liquid ejecting device that eject liquid droplets and the like for protection layer formation.

The technique can also be applied to various measuring devices and test devices such as a micro-dispenser that eject reagents and the like as liquid droplets. The technique can also be applied to various pattern rendering devices in which liquid droplets are agents for protecting members from etching. The technique can also be applied to a device that ejects a DNA-containing solution for detecting living organism samples.

(f) various modifications of the embodiment described above are conceivable within a scope of the spirit of the present invention. Various modifications and applications created on the basis of the description of this specification are also conceivable.

The invention claimed is:

1. A boundary value table optimizing device comprising:
    a selection-information readout unit that reads out, when information for selecting a boundary value table for multi-value error diffusion is stored, by ejection condition, in an information storing unit of a liquid ejecting head, which can represent one pixel with a large number of droplets, information matching an ejection condition from the information storing unit; and
    a boundary-value-table setting unit that sets, for reference by a halftoning unit, a boundary value table corresponding to the read-out information.

2. A boundary value table optimizing device characterized by comprising:
    a boundary-value readout unit that reads out, when sets of boundary values for multi-value error diffusion are stored, by ejection condition, in an information storing unit of a liquid ejecting head, which can represent one pixel with a large number of droplets, a set of boundary values matching an ejection condition from the information storing unit;
    a boundary-value-table creating unit that creates a boundary value table on the basis of the read-out set of boundary values;
    a boundary-value-table storing unit that stores the created boundary value table; and
    a boundary-value-table setting unit that sets the boundary value table for reference by a half toning unit.

3. A boundary value table optimizing device characterized by comprising:
    a test-pattern-signal generating unit that generate, according to an ejection condition, a test pattern signal used for determination of boundary values for multi-value error diffusion and directly drives a liquid ejecting head that can represent one pixel with a large number of droplets;
    a density reading unit that optically reads density of a test pattern actually formed; and
    a boundary-value-table setting unit that sets, for reference by a half toning unit, a boundary value table selected or created on the basis of the read density.

4. A boundary value table optimizing device according to claim 1, characterized in that the boundary value table is set by attribute of liquid.

5. A boundary value table optimizing device according to claim 1, characterized in that the boundary value table is set by liquid ejecting head or by nozzle chip.

* * * * *